(12) United States Patent
Xiong

(10) Patent No.: US 9,104,242 B2
(45) Date of Patent: Aug. 11, 2015

(54) PALM GESTURE RECOGNITION METHOD AND DEVICE AS WELL AS HUMAN-MACHINE INTERACTION METHOD AND APPARATUS

(71) Applicant: Huaixin Xiong, Beijing (CN)

(72) Inventor: Huaixin Xiong, Beijing (CN)

(73) Assignee: Ricoh Company, Ltd., Tokyo (JP)

(*) Notice: Subject to any disclaimer, the term of this patent is extended or adjusted under 35 U.S.C. 154(b) by 69 days.

(21) Appl. No.: 14/143,528

(22) Filed: Dec. 30, 2013

(65) Prior Publication Data

US 2014/0198031 A1  Jul. 17, 2014

(30) Foreign Application Priority Data

Jan. 16, 2013  (CN) .......................... 2013 1 0016169

(51) Int. Cl.
| | | |
|---|---|---|
| G09G 5/00 | (2006.01) | |
| G06F 3/01 | (2006.01) | |
| G06K 9/00 | (2006.01) | |

(52) U.S. Cl.
CPC ............ *G06F 3/017* (2013.01); *G06K 9/00389* (2013.01)

(58) Field of Classification Search
CPC ... G06F 3/017; G06F 3/0416; G06F 3/04883; G06F 19/3406; G06F 3/0304; G06F 3/044; G06F 3/04886; G06F 17/30265; G06F 1/203; G06F 21/32; G06F 2203/04104; G06F 2203/04808; G06F 3/011; G06F 3/013; G06F 3/0488; G06F 2203/0381; G06F 2203/04908
USPC .................................. 345/156, 169, 173, 175
See application file for complete search history.

(56) References Cited

U.S. PATENT DOCUMENTS

| 7,821,541 | B2 | 10/2010 | Delean | |
|---|---|---|---|---|
| 8,281,168 | B2* | 10/2012 | Nishida | 713/322 |
| 8,705,872 | B2* | 4/2014 | Ivanich et al. | 382/209 |
| 8,787,663 | B2* | 7/2014 | Litvak et al. | 382/165 |
| 8,854,557 | B2* | 10/2014 | Friedman | 348/734 |
| 2008/0163131 | A1* | 7/2008 | Hirai et al. | 715/863 |
| 2009/0167882 | A1* | 7/2009 | Chen et al. | 348/222.1 |
| 2009/0228841 | A1* | 9/2009 | Hildreth | 715/863 |
| 2011/0129124 | A1* | 6/2011 | Givon | 382/107 |
| 2012/0182296 | A1* | 7/2012 | Han | 345/419 |
| 2012/0218183 | A1* | 8/2012 | Givon et al. | 345/157 |
| 2013/0057469 | A1* | 3/2013 | Ajika | 345/156 |
| 2013/0278493 | A1* | 10/2013 | Wei et al. | 345/156 |
| 2014/0099018 | A1* | 4/2014 | Kandaswamy | 382/154 |

FOREIGN PATENT DOCUMENTS

CN  103208006 A  7/2013

OTHER PUBLICATIONS

Zhou Ren., et al., "Robust Hand Gesture Recognition Based on Finger-Earth Mover's Distance with a Commodity Depth Camera," Proc. 19th ACM Int'l Conf. Multimedia (ACM MM'11), ACM Press, pp. 1093-1096, 2011.

* cited by examiner

*Primary Examiner* — Duc Dinh
(74) *Attorney, Agent, or Firm* — Oblon, McClelland, Maier & Neustadt, L.L.P.

(57) ABSTRACT

Disclosed is a palm gesture recognition method comprising a step of obtaining plural images according to an order of time; a step of acquiring plural palm shaped images from the plural images; a step of extracting plural features describing an open or closed palm gesture from each of the plural palm shaped images; a step of calculating a maximum feature difference vector formed by a maximum difference of each of the plural features; and a step of determining, on the basis of the maximum feature difference vector, that there is the open or closed palm gesture or there isn't the open or closed palm gesture in the plural images.

10 Claims, 10 Drawing Sheets

"CLOSED" PALM GESTURE    "OPEN" PALM GESTURE

FIG.4
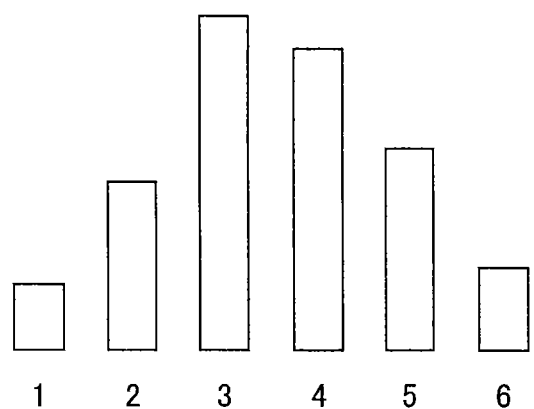
(a)
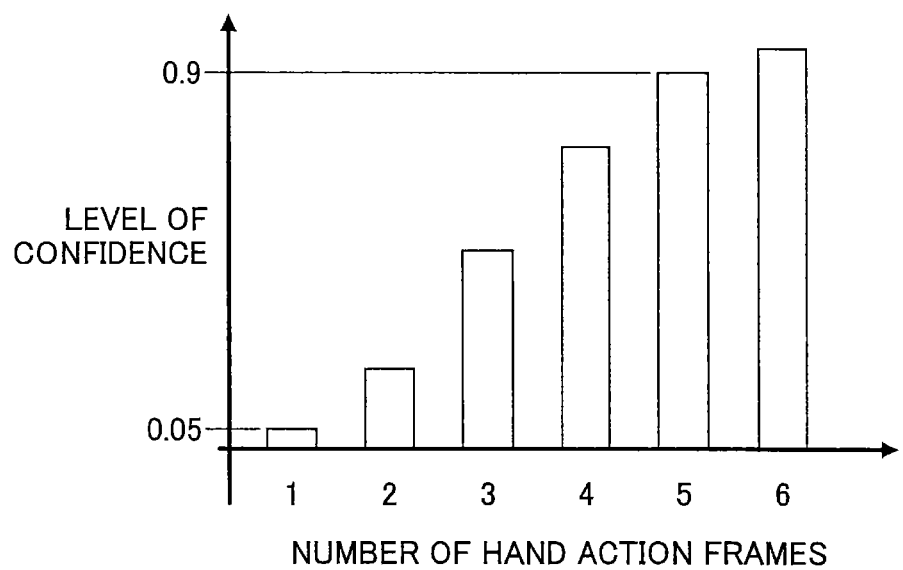
(b)

FIG.5
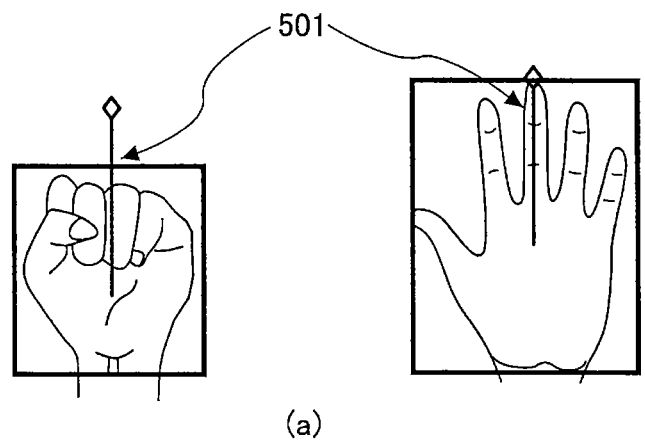
(a)
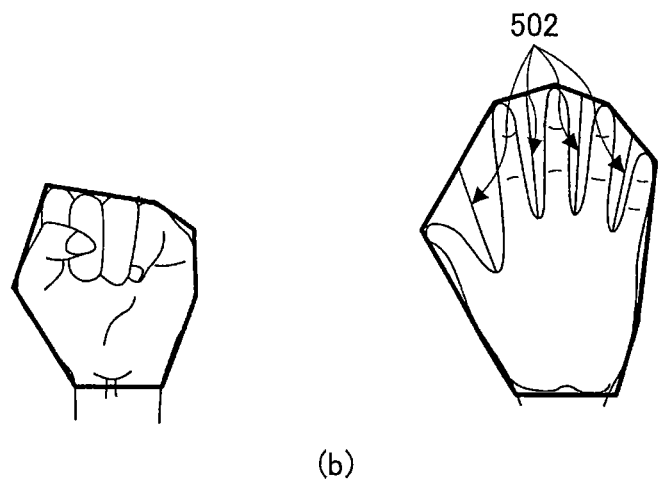
(b)
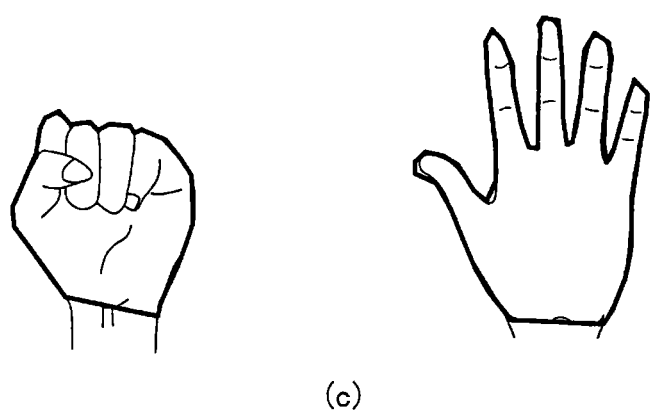
(c)

PALM GESTURE RECOGNITION METHOD AND DEVICE AS WELL AS HUMAN-MACHINE INTERACTION METHOD AND APPARATUS

BACKGROUND OF THE INVENTION

1. Field of the Invention

The present invention generally relates to image processing as well as machine vision-based human-machine interaction, and more particularly related to an open-or-closed palm gesture recognition method and an open-or-closed palm gesture recognition device as well as a human-machine interaction method and a human-machine interaction apparatus.

2. Description of the Related Art

A hand gesture is a kind of natural and intuitive communication way. The hand gesture may be used to carry out interaction with an electronic apparatus without assistance of any additional apparatus. A hand gesture recognition technique on the basis of computer vision has been widely utilized in human-machine interaction. The hand gesture recognition technique on the basis of computer vision may accept the input of a visualized image, and may output the type of hand gesture or hand action. In this way, an apparatus controlled by a computer may interpret a hand gesture or hand action as an instruction (command) so as to achieve an operation of human-machine interaction such as a turn-on/turn-off operation, a click operation, a touch operation, or a switch operation.

In patent reference No. 1 (U.S. Pat. No. 7,821,541B2), a method of recognizing two gestures of a hand is disclosed. The two hand gestures are a closed fit and an open palm. The recognition mentioned in the reference refers to one carried out with respect to fingers corresponding to a static (still) open palm and a static closed fit. In this method, only a single static feature is utilized. For example, an "open" state is determined on the basis of whether or not there are three continuous extended fingers approaching another finger (a fourth finger). However, in an actual system, it is not easy to obtain a clear outline image of a hand (in general, influenced by distance, accuracy of an apparatus, the lighting condition, etc.). As a result, this method is not robust. In addition, this method carries out the recognition only on the basis of a single image (frame).

In a non-patent reference (Zhou Ren, "Robust Hand Gesture Recognition Based on Finger-Earth Mover's Distance with a Commodity Depth Camera", Proceedings of the 19$^{th}$ ACM International Conference on Multi-Media, MM'11, ACM, New York, N.Y., USA, 2011, pp. 1093-1096), a time-series curve is adopted for expressing the shape information of a hand. This time-series curve includes distances between points on the outline of the hand and the center of the hand. In addition, in this paper, a so-called "finger-earth mover's distance operator" is defined for calculating the similarity of two hand shapes. However, this method carries out the recognition by employing a template matching technique.

In the recognition of a palm gesture, aside from the template matching and the intuitive way, another well-used method is a classifier technique on the basis of machine learning. The classifier technique on the basis of machine learning may provide a robust recognition effect. The reason is that this kind of technique comprehensively considers the influence of various features with respect to the classification. As a result, the classifier technique has been widely utilized in the recognition of static gestures and dynamic gestures.

In patent reference No. 2 (Chinese Patent Application No. 201200147172), a hand gesture recognition method on the basis of classifiers is disclosed. This method adopts the so-called "depth difference distribution operator" to extract a CDDD feature from a few adjacent images, for describing the depth difference distributions before and after a hand action. The CDDD feature is a multi-dimensional feature vector whose dimension depends on the number of images (frames) adopted in a hand gesture recognition unit. For example, if three images are used as one hand gesture recognition unit, then the dimension of the feature vector is 128, and if four image are used as one hand gesture recognition unit, then the dimension of the feature vector is 192. However, as for this technique, on the one hand, it is necessary to apply a large number of samples to machine learning so as to obtain the multi-dimensional feature vector; on the other hand, if the number of frames changes, then in general it is impossible to carry out the hand gesture recognition well. In addition, this method may only use depth images; as a result, the application of this method with respect to the conventional color images is limited.

SUMMARY OF THE INVENTION

The present invention focuses on a hand action related to an "open" or "closed" palm gesture. Here it should be noted that in this specification, a "closed" palm gesture means a closed fist-like hand gesture. Different from a static palm gesture, a hand action related to an "open" or "closed" palm gesture refers to a state change sequence from an "open" palm gesture to a "closed" palm gesture or from a "closed" palm gesture to an "open" palm gesture. The state change sequence includes gradually-changed intermediate states between the two gestures. Here it should be noted that in the present invention, the "closed" palm gesture refers to not only a fist-like shape when five fingers are retracted towards the palm but also a claw-like shape when five fingers are bent and gathered to one point.

According to an embodiment of the present invention, an open-or-closed palm gesture recognition method is provided which is used to recognize a palm gesture from open to closed or from closed to open by utilizing image processing. The open-or-closed palm gesture recognition method comprises an image obtainment (obtention) step of obtaining plural images according to an order of time; a palm shape image acquirement (acquisition) step of acquiring plural palm shaped images from the plural images; a feature extraction step of extracting plural features describing the palm gesture from each of the plural palm shaped images, wherein, each of the plural features has a monotonic characteristic that values corresponding to this feature obtained during a process from an open palm gesture to a closed palm gesture or from a closed palm gesture to an open palm gesture gradually decrease or increase; a maximum feature difference vector calculation step of calculating a maximum feature difference vector formed by a maximum difference of each of the plural features, wherein, the maximum difference of the corresponding feature, which has a sign attribute and an width attribute, is calculated by obtaining a difference related to the corresponding features between two of the plural palm shaped images according to a predetermined order, and an absolute value of the maximum difference is a maximum absolute value of a difference related to the corresponding features between any two of the plural palm shaped images; and an open-or-closed palm gesture determination step of determining, on the basis of the maximum feature difference vector, that there is an open palm gesture or a closed palm gesture, or there is not an open or closed palm gesture in the plural images.

According to another embodiment of the present invention, an open-or-closed palm gesture recognition device is provided which is used to recognize a palm gesture from open to closed or from closed to open by utilizing image processing. The open-or-closed palm gesture recognition device comprises an image obtainment part configured to obtain plural images according to an order of time; a palm shape image acquirement part configured to acquire plural palm shaped images from the plural images; a feature extraction part configured to extract plural features describing the palm gesture from each of the plural palm shaped images, wherein, each of the plural features has a monotonic characteristic that values corresponding to this feature obtained during a process from an open palm gesture to a closed palm gesture or from a closed palm gesture to an open palm gesture gradually decrease or increase; a maximum feature difference vector calculation part configured to calculate a maximum feature difference vector formed by a maximum difference of each of the plural features, wherein, the maximum difference of the corresponding feature, which has a sign attribute and a width attribute, is calculated by obtaining a difference related to the corresponding features between two of the plural palm shaped images according to a predetermined order, and an absolute value of the maximum difference is a maximum absolute value of a difference related to the corresponding features between any two of the plural palm shaped images; and an open-or-closed palm gesture determination part configured to determine, based on the maximum feature difference vector, that there is an open palm gesture or a closed palm gesture, or there is not an open or closed palm gesture in the plural images.

In the open-or-closed palm gesture recognition method and the open-or-closed palm gesture recognition device according to the embodiments of the present invention, the monotonic characteristic that values related to the corresponding feature obtained during a process from an open palm gesture to a closed palm gesture or from a closed palm gesture to an open palm gesture gradually decrease or increase is adopted to determine the maximum feature difference vector on the basis of the respective features, and the palm gesture determination is carried out on the basis of the maximum feature difference vector. As a result, at least the following advantage may be obtained, namely, it is possible to, since the monotonic characteristic of the hand action related to the pale gesture is described intuitively, not only accelerate the classifier learning and palm gesture recognition due to low dimensions but also be self-adaptive when the number of hand action frames changes in a case where the length of a sliding window is fixed. Here, the number of hand action frames (images) refers to the number of images captured by an image capture device during a period of time from a start palm gesture to an end palm gesture. In general, since hand actions related to palm gestures of different users vary, and capture rates of different image capture devices also vary, the number of hand action frames is not fixed. For example, in a case where a capture rate is 30 frames/second, according to a statistical result, the number of hand action frames is usually between two to six.

Furthermore, in the open-or-closed palm gesture recognition method and the open-or-closed palm gesture recognition device according to the embodiments of the present invention, it is possible to determine, in a case where it is determined that there is an open or closed palm gesture, a start palm gesture frame and an end palm gesture frame. In particular, two images (frames) are determined which are related to the maximum difference of each of the plural features, and then the two images are regarded as a candidate start palm gesture frame and a candidate end palm gesture frame related to the corresponding feature. After that, on the basis of the weight of each of the plural features as well as the candidate start palm gesture frame and the candidate end palm gesture frame related to the corresponding feature, the start palm gesture frame and the end palm gesture frame are determined. By utilizing the determined start palm gesture frame and end palm gesture frame, it is possible to obtain the time point of the start palm gesture frame and the time point of the end palm gesture frame. As a result, for example, if these kinds of information are applied to a system like a "handMouse", then it is possible to accurately determine the position of a cursor so as to provide accurate position information.

Moreover, in the open-or-closed palm gesture recognition method and the open-or-closed palm gesture recognition device according to the embodiments of the present invention, the position of the sliding window is moved according to an image sequence; the palm shape image acquirement step, the feature extraction step, the maximum feature difference vector calculation step, and the open-or-closed palm gesture determination step are carried out with respect to plural images in the moved sliding window; and if a same open or closed palm gesture is obtained by the palm gesture recognition carried out with respect to the plural images in the sliding window before and after movement, then the palm gesture recognition results are combined as one open or closed palm gesture, and the corresponding start frame and end frame are modified accordingly. In this way, it is possible to combine the palm gesture recognition results of two adjacent recognition parts, and to more accurately provide a start palm gesture frame and an end palm gesture frame, so as to better perform human-machine interaction.

According to still another embodiment of the present invention, a human-machine interaction method is provided. The human-machine interaction method comprises a step of controlling, on the basis of a hand motion and a previous hand gesture, when an open-or-closed palm gesture recognition process starts; a step of carrying out, when the open-or-closed palm gesture recognition process starts, the open-or-closed palm gesture recognition process by utilizing the open-or-closed palm gesture recognition method; and a step of causing, when an open or closed palm gesture is recognized, the open or closed palm gesture to correspond to a control command, and carrying out the control command so as to control an operation and display of an object on a display device.

According to still another embodiment of the present invention, a human-machine apparatus is provided. The human-machine apparatus comprises the open-or-closed palm gesture recognition device; an open-or-closed palm gesture recognition control device configured to control, on the basis of a hand motion and a previous hand gesture, when the open-or-closed palm gesture recognition device starts to carry out an open-or-closed palm gesture recognition process; and a gesture-command correspondence device configured to cause, when an open or closed palm gesture is recognized, the open or closed palm gesture to correspond to a control command, and to carry out the control command corresponding to the open or closed palm gesture.

By employing the human-machine interaction method and the human-machine interaction apparatus according to the embodiments of the present invention, it is possible to not only avoid making an incorrect recognition report generated by palm gesture recognition due to motion blur in a high-speed motion process but also guarantee that the recognition may be carried out with respect to any palm gesture of interest.

BRIEF DESCRIPTION OF THE DRAWINGS

FIG. 4 includes (a) and (b), wherein, (a) illustrates a histogram of the number of frames (images) in a palm gesture cycle in a case where a sampling rate is 30 frames/second (a), and (b) illustrates the probability distribution corresponding to the histogram;

FIG. 5 includes (a), (b), and (c), wherein, (a) illustrates two minimum rectangles respectively covering two palms along a main direction, (b) illustrates two convex polygons respectively based on two palm outlines, and (c) illustrates two palm outlines;

DETAILED DESCRIPTION OF THE PREFERRED EMBODIMENTS

Hereinafter, various embodiments of the present invention will be concretely described with reference to the drawings. However, it should be noted that the same symbols, which are in the specification and the drawings, stand for constructional elements having the basically-same function and structure, and repeated explanations for the constructional elements are omitted.

In order to let those people skilled in the art better understand the present invention, the present invention will be illustrated in detail on the basis of the embodiments and the drawings according to the following order.

1. Application Scenario
2. Open-or-Closed Palm Gesture Recognition Method
2.1. Flowchart of Open-or-Closed Palm Gesture Recognition Method
2.2. Determination Method of Start and End Frames of Palm Gesture-Related Hand Action
2.3. Combination Method of Palm Gestures of Adjacent Palm Gesture Recognition Units
3. Open-or-Closed Palm Gesture Recognition Device
4. Human-Machine Interaction Apparatus
5. Human-Machine Interaction Method
6. System Hardware Arrangement
7. Conclusion

1. APPLICATION SCENARIO

Figure 1:
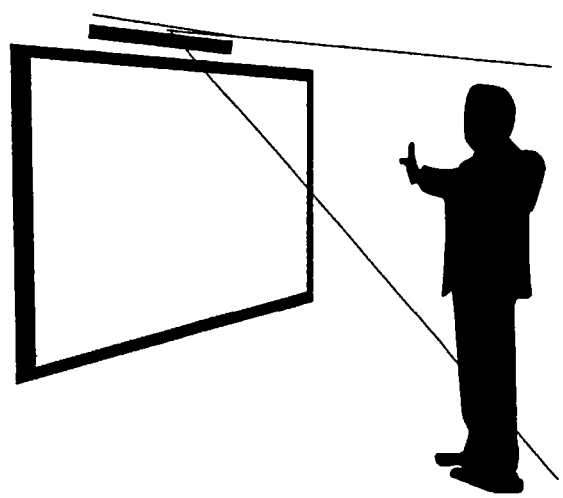
FIG. 1 illustrates an example of a typical application scenario suitable for embodiments of the present invention.

For the sake of convenience, FIG. 1 illustrates an example of a typical application sense suitable for the embodiments of the present invention.

A camera (for example, a depth camera or a conventional camera) is set in front of a user, and the user stands facing a display device, and uses his hands to carry out a non-touch remote operation, for example, an open or closed palm gesture-related hand action involved in the present invention. In this interaction process, there is no need to utilize an external assistant device, for example, an infrared pointing device, etc. That is to say, it is possible to carry out various operations only by using hand gestures.

Of course, this application scenario is just an example. Here, the display device may be, for example, a liquid display panel, a projection screen, a smart phone screen, a tablet computer screen, or a television screen. Furthermore, the display device is not a must. For example, the user may carry out a control operation with respect to a refrigerator (which may include or exclude a display screen) by performing the open or closed palm gesturer-related hand action.

Figure 2:
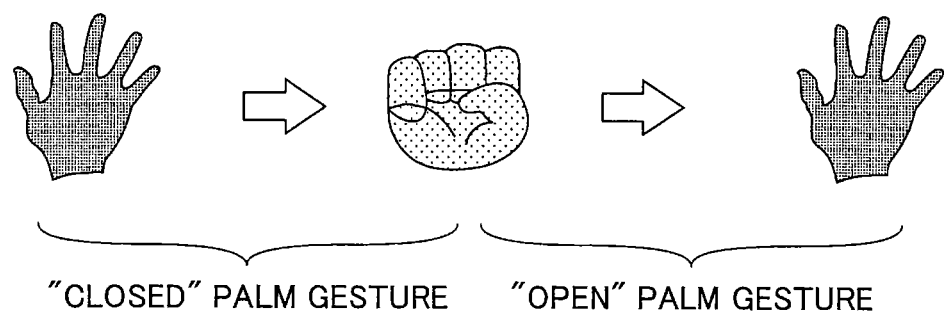
FIG. 2 illustrates a hand action related to a palm gesture according to an embodiment of the present invention.

FIG. 2 illustrates a hand action related to a palm gesture according to an embodiment of the present invention.

Here it should be noted that a hand action related to a palm gesture refers to a state change sequence from an "open" palm gesture to a "closed" palm gesture or from a "closed" palm gesture to an "open" palm gesture, including gradually-changed intermediate states between the two palm gestures. Furthermore, the "closed" palm gesture refers to not only a fist-like shape that five fingers are retracted towards the palm but also a claw-like shape that five fingers are bent and gathered to one point. In general, since hand actions related to palm gestures of different users vary, and sampling rates of different image capture devices also vary, the number of hand action frames in a palm gesture cycle (a period of time from a start palm gesture to an end palm gesture) is not fixed. For example, in a case where operation speed is normal, and a sampling rate is 30 frames/second, the number of hand action frames in a palm gesture cycle is usually between two and six.

2. OPEN-OR-CLOSED PALM GESTURE RECOGNITION METHOD

In what follows, an open-or-closed palm gesture recognition method according to an embodiment of the present invention is illustrated on the basis of the drawings.

2.1. Flowchart of Open-or-Closed Palm Gesture Recognition Method

Figure 3:
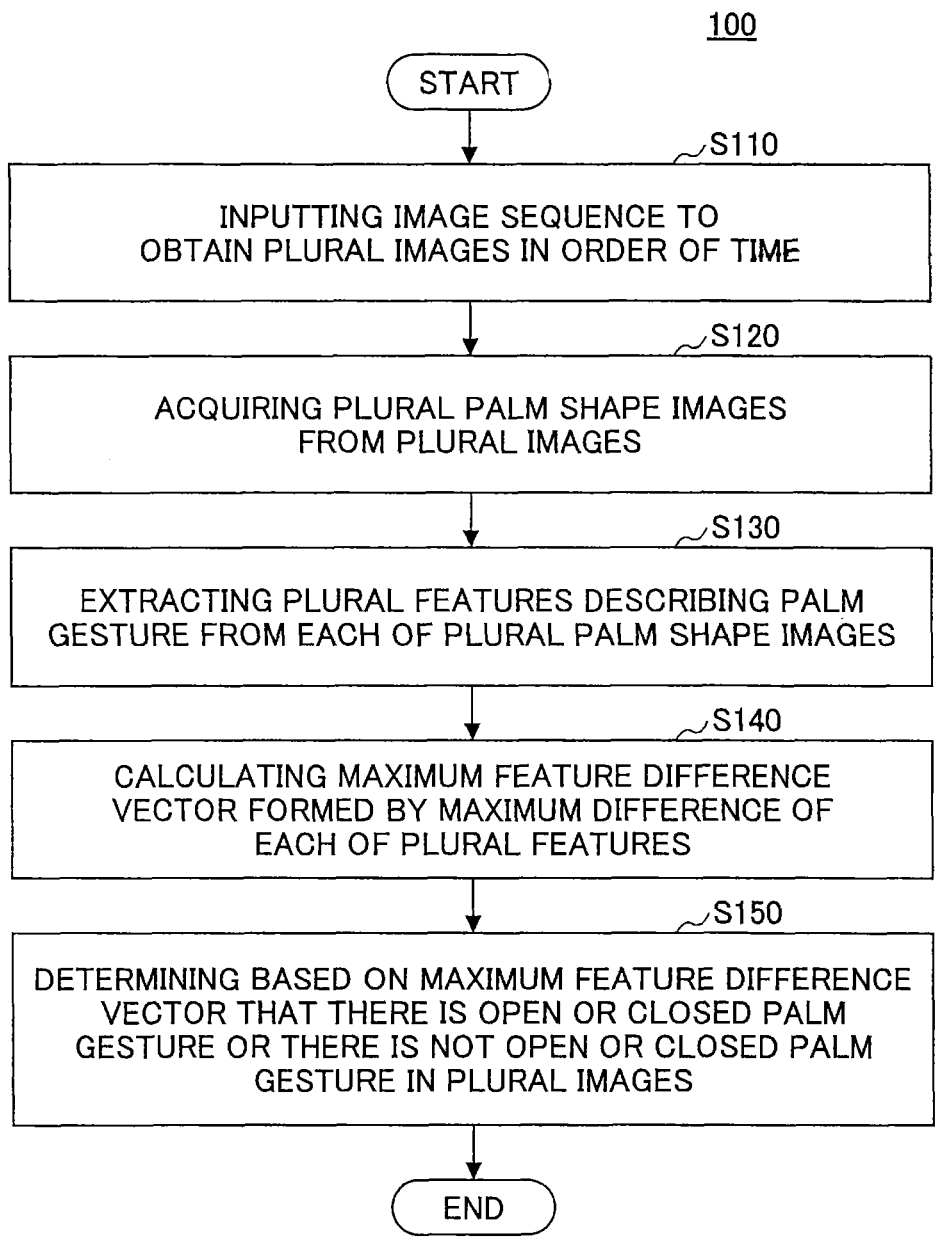
FIG. 3 is a flowchart of an open-or-closed palm gesture recognition method according to a first embodiment of the present invention.

FIG. 3 is a flowchart of an open-or-closed palm gesture recognition method 300 according to a first embodiment of the present invention.

As shown in FIG. 3, in STEP S110, an image sequence is input, i.e., plural images in an order of time are obtained.

Here it should be noted that the image sequence may be directly input in an order of time from a local camera capturing images or video, or may be input remotely via a wired or wireless network. Moreover, the image mentioned here may be a depth map or a normal color image.

In addition, it is possible to determine the number of images (frames) or the so-called "size of a sliding window" (since a palm gesture-related hand action usually is a continuous process occurring in the input image sequence, a normal processing method is taking a sliding window having a fixed length and letting the sliding window slide in the input image sequence so as to select a few adjacent images (frames) to serve as a palm gesture recognition unit) necessary for the open-or-closed palm gesture recognition on the basis of experience or statistics.

According to an embodiment of the present invention, the number of plural images may be determined on the basis of both a predetermined level of confidence and a frequency histogram of the number of hand action frames.

In what follows, it is illustrated by referring to FIG. 4 for how to determine the number of images serving as a palm gesture recognition unit or the size of a sliding window on the basis of a predetermined level of confidence and a frequency histogram of the number of hand action frames.

In FIG. 4, (a) illustrates a distribution histogram of the number of frames (images) in a palm gesture cycle (from "open" to "closed" or from "closed" to "open") in a case where a sampling rate is 30 frames/second. In the distribution histogram, the number under each column refers to the number of frames, and the height of each column refers to a statistical value in which a palm gesture-related hand action needs the corresponding number of frames. In particular, in an order from left to right in (a) of FIG. 4, the columns respectively refer to a statistical value that a palm gesture-related hand action finishes in a frame, a statistical value that a palm gesture-related hand action finishes in two frames, a statistical value that a palm gesture-related hand action finishes in three frames, a statistical value that a palm gesture-related hand action finishes in four frames, a statistical value that a palm gesture-related hand action finishes in five frames, and a statistical value that a palm gesture-related hand action finishes in six frames. According to (a) of FIG. 4, it is obvious that in most cases, a palm gesture-related hand action may finish in three or four frames.

In FIG. 4, (b) illustrates the probability distribution corresponding to (a). In (b) of FIG. 4, the vertical axis refers to a level of confidence, and the horizontal axis refers to the number of frames. In particular, for example, a 0.9 level of confidence corresponds to the number of frames 5 that means a palm gesture-related hand action finishes in five frames, and a 0.05 level of confidence corresponds to the number of frames 1 that means a palm gesture-related hand action finishes in one frame. Here it should be noted that a level of confidence represents a level that a palm gesture-related hand action may finish in K frames. For example, a level of confidence 0.9 means in 90% of cases, a palm gesture-related hand action may finish in K frames.

As a result, by determining the number of hand action frames serving as a palm gesture recognition unit on the basis of both a predetermined level of confidence and a frequency histogram of the number of hand action frames according to the above-described example, it is possible to improve the efficiency and accuracy of the open-or-closed palm gesture recognition.

After the plural images are obtained in STEP S110, the processing of this method goes to STEP S120.

In STEP S120, plural palm shaped images are extracted, i.e., the plural palm shaped images are extracted from the plural images, respectively.

Before carrying out feature extraction, it is necessary to divide the foreground of an image including a palm. Many techniques such as skin color detection, a method on the basis of depth threshold values, or a method on the basis of connected component analysis may be utilized to achieve the image division. However, regardless of what kind of division technique is utilized or what kind of image is used, after the division, the influence of the background or non-palm parts may be removed from the image. In this way, it is possible to finally obtain a relatively clear palm shape image (the upper part of a wrist), and to easily extract a feature able to describe a palm gesture from the obtained palm shape image.

After the palm shape images are obtained, the processing of this method goes to STEP S130.

In STEP S130, the feature extraction is carried out, i.e., plural features able to describe a palm gesture are extracted from each of the plural palm shaped images. Each of the plural features has a monotonic characteristic that values corresponding to this feature obtained during a process from an open palm gesture to a closed palm gesture or from a closed palm gesture to an open palm gesture gradually decrease or increase.

Since the accuracy of a camera is usually insufficient, and because there is a certain distance between the lens of the camera and a subject (a camera-to-subject distance), in general, the ratio of the area of an obtained palm shape image to the area of the originally sampled image is small, and the obtained palm shape image includes noise. Hence, in order to obtain a robust recognition result, a monotonic characteristic that values corresponding to a feature obtained during a process from an open palm gesture to a closed palm gesture or from a closed palm gesture to an open palm gesture gradually decrease or increase is proposed in the present invention. In this way, the respective feature differences between the two palm gestures are enhanced.

Here it should be noted that a monotonic characteristic of values corresponding to a feature is defined as follows. For example, as for a state change sequence (i.e., a hand action from an "open" palm gesture to a "closed" palm gesture) from an "open" palm gesture to a "closed" palm gesture, a sequence of values corresponding to a feature related to the state change sequence satisfies monotonic increasing or monotonic decreasing. As for a state change sequence (i.e., a hand action from a "closed" palm gesture to an "open" palm gesture) from a "closed" palm gesture to an "open" palm gesture, a sequence of values corresponding to a feature related to the state change sequence satisfies monotonic decreasing or monotonic increasing.

In the present invention, various geometric shapes related to a palm foreground image are adopted to calculate features describing different palm gestures. In this way, it is possible to better distinguish between the above-described two kinds of palm gestures. In particular, two kinds of geometric shapes adopted in this embodiment; they are (i) a minimum rectangle covering a palm along a main direction of the palm as shown in (a) of FIG. 5; and (ii) a convex polygon on the basis of the palm outline as shown in (b) of FIG. 5.

The minimum rectangle covering a palm along the main direction of the palm has two sides parallel to the main direction of the palm, and is a minimum rectangle which may cover the area of the palm. In particular, a main direction of a palm (for example, a direction indicated by a straight line 501 in (a) of FIG. 5) may be calculated by adopting a principal component analysis (PCA) method. For example, on the left side in (a) of FIG. 5, a minimum rectangle covering a palm having a closed palm gesture along the main direction is illustrated, and on the right side in (a) of FIG. 5, a minimum rectangle covering a palm having an open palm gesture along the main direction is illustrated.

In addition, the convex polygon is defined as a minimum convex polygon P of a point set Q forming a palm outline. Any point in the point set Q is located either on one side of the convex polygon P or inside the convex polygon P. The palm outline may be obtained from the result of the above-described STEP S120. For example, on the left side in (c) of FIG. 5, a palm outline of a palm having a closed palm gesture is illustrated, and on the right side in (c) of FIG. 5, a palm outline of a palm having an open palm gesture is illustrated. Moreover, on the left side in (b) of FIG. 5, a minimum convex polygon on the basis of a palm outline of a palm having a closed palm gesture is illustrated, and on the right side in (b) of FIG. 5, a minimum convex polygon on the basis of a palm outline of a palm having an open palm gesture is illustrated.

On the basis of the minimum rectangle covering a palm along a main direction of the palm and the convex polygon based on the palm outline, it is possible to extract the following geometric features for describing a palm gesture from different layers of an image (frame) according to the cognitive habit of human beings from rough to fine.

On a rough layer, a minimum rectangle (as shown in (a) of FIG. 5) covering a palm along a main direction of the palm is obtained. After that, the width f1, the height f2, and the area f3 of the minimum rectangle are calculated to serve as features.

On an intermediate layer, a minimum convex polygon (as shown in (b) of FIG. 5) on the basis of the palm outline in obtained, After that, the perimeter f4, the area f5, and the defective value f6 are calculated to serve as features.

On a fine layer, the outline of the palm (as shown in (c) of FIG. 5) is obtained. After that, the length f7 of the palm outline and the area f8 of the palm surrounded by the palm outline are calculated to serve as features.

The defective value f6 of the convex polygon calculated on the intermediate layer refers to the length sum of all defective lines of the convex polygon. Here it should be noted that a defective line of a convex polygon refers to a straight line from the midpoint of a straight line connecting two adjacent fingertips to the joint of the corresponding two fingers; for example, in (b) of FIG. 5, each of the straight lines 502 represents a defective line. All functions necessary to calculate the above-described features may be found in OpenCV.

The above eight features f1 to f8 extracted from the three layers satisfy the above-described monotonic characteristic in view of a state change sequence between two palm gestures (i.e., an open palm gesture and a closed palm gesture).

By calculating features of different palm gestures on the basis of the two kinds of geometric shapes (a convex polygon based on a palm outline and a minimum rectangle covering the corresponding palm along its main direction), it is possible to enlarge the feature differences between the two palm gestures, so that it is possible to better distinguish between the two palm gestures. In this way, it is possible to better solve the problem of noise influence in recognition.

Here it should be noted that the above eight features f1 to f8 are just preferred examples. That is to say, those people skilled in the art may select any other feature able to describe a palm gesture and able to satisfy the above-described monotonic characteristic in view of a state change sequence between two palm gestures (i.e., an open palm gesture and a closed palm gesture).

After the plural features are extracted in STEP S130, the processing of this method goes to STEP S140.

In STEP S140, a maximum feature difference vector is calculated, i.e., a maximum feature difference vector formed by a maximum difference of each of the plural features is calculated. The maximum difference of the corresponding feature, which has a sign attribute and a width attribute, is calculated by obtaining a difference related to the corresponding feature between two of the plural palm shaped images according to a predetermined order. The absolute value of the maximum difference is a maximum absolute value of a difference related to the corresponding feature between any two of the plural palm shaped images.

By using a sliding window, K images (frames) are selected to serve as a palm gesture recognition unit. As for each of K images, for example, the above-described eight features f1 to f8 extracted to serve as a set of features for describing a palm gesture. After that, a maximum feature difference vector is calculated on the basis of K feature sets, and the calculated maximum feature difference vector is further used to describe changes of palm gestures in the palm gesture recognition unit. Each component of the maximum feature difference vector represents a maximum difference related to the corresponding component in the palm gesture recognition unit.

Figure 6:
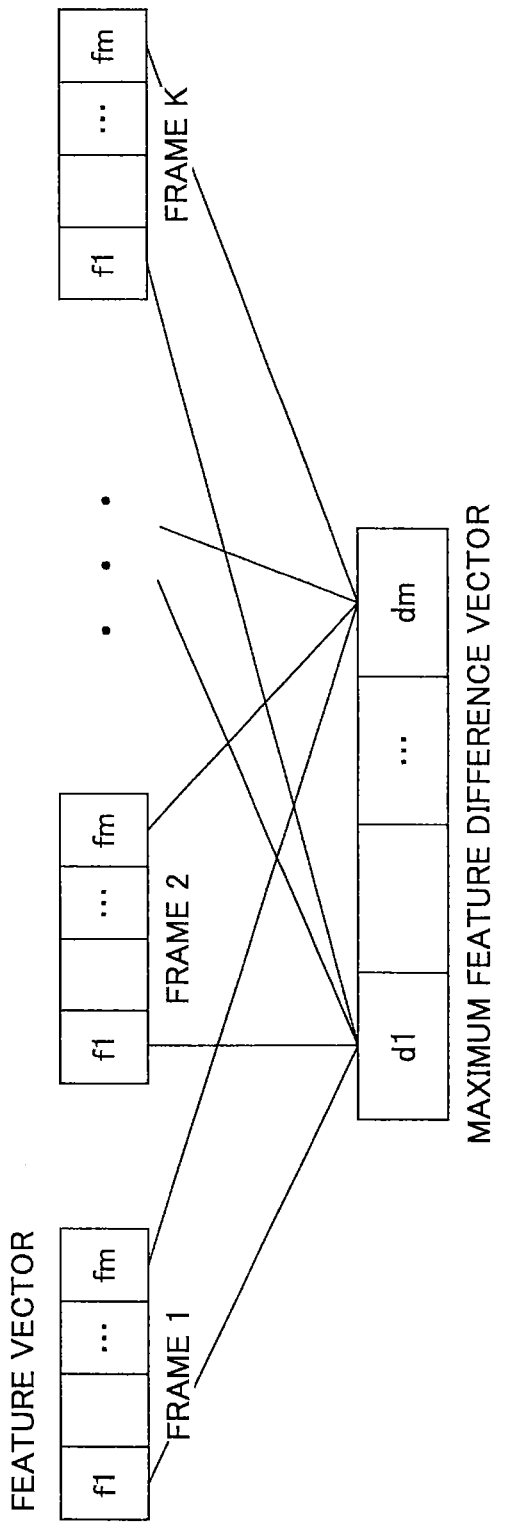
FIG. 6 illustrates an example of how to calculate a maximum feature difference vector on the basis of K m-dimensional feature vectors in an image sequence formed by K frames.

FIG. 6 illustrates an example of how to calculate a maximum feature difference vector on the basis of K m-dimensional feature vectors (each feature extracted in STEP S130 serves as one component of the corresponding feature vector).

Here it should be noted that maximum feature differences represent changes of values related to the corresponding features in a sequence formed by K frames. In particular, each maximum feature difference represents a one-way maximum change of values related to the corresponding feature for describing a palm gesture. As a result, the dimension of the maximum feature difference vector only relies on the number of features extracted from a single frame, i.e., is not relevant to the number of the frames in the palm gesture recognition unit.

In a particular embodiment, the feature f1 is taken as an example for illustrating how to calculate its corresponding maximum difference in K frames (K feature vector sets). Here f1 refers to the width of a maximum rectangle covering a palm along a main direction of the palm. It is intuitively obvious that values related to f1 may decrease gradually in a process from an open palm gesture to a closed palm gesture, and may increase gradually in a process from a closed palm gesture to an open palm gesture. In fact, the values related to the above-described eight features f1 to f8 satisfy the above-described monotonic characteristic in view of a state change sequence between the two palm gestures (i.e., the open palm gesture and the closed palm gesture).

The maximum difference d1 corresponding to the feature f1 in K frames (K feature vector sets) is defined (calculated) as following.

$$d1 = f1(s) - f1(e), \text{ wherein, } |f1(s) - f1(e)| = \text{Max}(|f1(i) - f1(j)|) \quad (1)$$

Here, i and j refer to indexes of images, and satisfy $0 < i, j \leq K$ and $i < j$.

The above equation (1) indicates that the calculation of the maximum difference is on the basis of all combinations of one-way feature differences in a set of K images (frames). Since the values related the features satisfy the monotonic characteristic as described above, the maximum feature difference d1 may intuitively express a change rule from an open palm gesture to a closed palm gesture or from a closed palm gesture to an open palm gesture (the direction and width of change).

In this way, it is possible to define (calculate) all maximum feature differences dm (m=1, 2, ..., m) corresponding to all features. After that, by combining these maximum feature differences d1, d2, ... dm, it is possible to obtain a maximum feature difference vector {d1, d2, ..., dm} for carrying out the palm gesture recognition.

Here it should be noted that according to the above equation (1), the maximum feature difference related to each of the features f1, f2, ..., fm is a one-dimensional vector having a plus or minus sign. For example, as for the above-described features f1 to f8, values related to each of them in a process from an open palm gesture to a closed palm gesture satisfy monotonic decreasing. As a result, in an ideal case, in an image sequence from an open palm gesture to a closed palm gesture, each component of the corresponding maximum feature difference vector should be a vector having a minus sign. On the other hand, as for the above-described features f1 to f8, values related to each of them in a process from a closed palm gesture to an open palm gesture satisfy monotonic decreasing. As a result, in an ideal case, in an image sequence from a closed palm gesture to an open palm gesture, each component of the corresponding maximum feature difference vector should be a vector having plus sign.

Furthermore, it should be noted that in the above equation (1), as for a one-dimensional vector, the maximum difference is calculated by subtracting an image having greater index from an image having a lesser index. However, it is also okay to subtract an image having a lesser index from an image having a greater index, and then to calculate its absolute value.

Moreover, as for the calculation of the maximum feature difference vector, in a case where the length of a sliding window is fixed, no matter how many frames it takes for a hand action to finish (for example, in K frames or in a part of K frames), it is possible to obtain a nearly equal maximum feature difference. As a result, regarding the feature description and extraction, it is possible to obtain a good effect being self-adaptive for the change of the number of hand action frames.

After the maximum feature difference vector is obtained in STEP S140, the processing of this method goes to STEP S150.

In STEP S150, open-or-closed palm gesture determination is carried out, i.e., it is determined on the basis of the maximum feature difference vector that there is an open palm gesture or a closed palm gesture, or there is not an open palm gesture or a closed palm gesture in the plural images.

In an example, a machine learning technique is utilized. In particular, a classifier is used to carry out classification with respect to the maximum feature difference vector {d1, d2, ..., dm} so as to obtain a palm gesture classification result of the palm gesture recognition unit. It is possible to use a number to indicate the classification result. For example, 0 may be used to indicate that there is not an open palm gesture or a closed palm gesture. 1 may be used to indicate that there is a closed palm gesture. 2 may be used to indicate that there in an open palm gesture. Many kinds of classifiers may be utilized here, for example, a decision tree classifier, a random forest classifier, AdaBoost, a support vector machine (SVM), or a BP neural network. As for a classifier, it has a training process and a recognition process in general. In the training process, by carrying out training with respect to a set of samples, the classifier is trained, i.e., parameters or a form related to the classifier are determined. For example, samples used for training may have the following form, namely, [L, d2, d2, ..., dm] where L refers to a classification index. On the other hand, in the recognition process, classification is carried out with respect to samples prepared to be classified (i.e., samples which have not been classified), and the classified result, i.e., the palm gesture recognition result is output. Here it should be noted that the classified result may have different forms if different classifiers having different forms are used to carry out the classification or on the basis of actual needs. For example, the classified result may be simply expressed by the following, namely, if the corresponding maximum feature difference vector is classified as 0, then that means there is not an open palm gesture or a closed palm gesture; if the corresponding maximum feature difference vector is classified as 1, then that means there is a closed palm gesture; and if the corresponding maximum feature difference vector is classified as 2, then that means there is an open palm gesture. Of course, the classified result may also be expressed by any other proper form, for example, expressed by probabilities belonging to various classes.

Here it should be noted that although a classifier is taken as an example for illustrating how to determine, on the basis of the maximum feature difference vector, whether or not there is a palm gesture, this kind of determination method is just an example. That is to say, this kind of determination method is not used to limit the present invention. Alternatively, it is also possible to carry out the open-or-closed palm gesture determination on the basis of, for example, a rule. For example, it is possible to make a rule as follows. As for the eight components in the maximum feature difference vector, if the number of the components, whose related values are greater than a predetermined first threshold value, for example, 0.5, is greater than a predetermined second threshold values, for example, 5, then it may be determined that there is an open palm gesture. Furthermore, as for the eight components in the maximum feature difference vector, if the number of the components, whose related values are less than a predetermined third threshold value, for example, −0.5, is greater than a predetermined fourth threshold value, for example, 5, then it may be determined that there is a closed palm gesture; otherwise, it may be determined that there is not an open or closed palm gesture. Of course, this is just an example taken for easily illustrating the present invention. Actually, in a broad sense, the above-described method on the basis of a rule may be classified as a method on the basis of a classifier. For example, the method on the basis of a rule may be translated into a decision tree classifier, etc. In addition, it is also possible to utilize a template matching method to determine an open or closed palm gesture in the plural image on the basis of the maximum feature difference vector. However, in a broad sense, the method on the basis of template matching may also be translated into a classifier, for example, a nearest neighbor classifier. Here it should be noted that, in general, the meaning of a classifier in the present invention is broad, i.e., the determination in the present invention includes those on the basis of rules and template matching.

As a result, in the open or closed palm gesture recognition method according to the embodiments, it is proposed that the values related to each of the plural features during a palm gesture-related hand action process (i.e., a process from an open palm gesture to a closed palm gesture or from a closed palm gesture to an open palm gesture) gradually decrease or increase to satisfy the monotonic characteristic (i.e., monotonic increasing or monotonic decreasing) so that the maximum feature difference vector is determined on the basis of the respective features, and then the palm gesture determination is carried out on the basis of the maximum feature difference vector. As a result, at least the following advantage may be obtained, namely, it is possible to, since the monotonic characteristic of the palm gesture-related hand action is described intuitively, not only accelerate classifier learning and palm gesture recognition due to lower dimensions but also be self-adaptive in a view of feature extraction when the number of hand action frames changes in a case where the length of a sliding window is fixed.

2.2 Determination Method of Start and End Frames of Palm Gesture-Related Hand Action Up to here, the open or closed palm gesture recognition method has been illustrated on the basis of FIG. 1. The result of the open or closed palm gesture recognition method gives that there is an open or closed palm gesture, or there is not an open or closed palm gesture. However, in some hand gesture-based control systems, it is necessary to accurately detect a start point (i.e., a start frame) and an end point (i.e., an end frame) of a hand action. For example, in a "HandMouse" system, the motion of a hand, i.e., the tracking point of the hand is utilized to control the movement of a cursor, and a palm gesture-related hand action is further utilized to simulate the action of a mouse button. In this kind of system, it is necessary to accurately detect the start frame and the end frame of the palm gesture-related hand action. The reason is that during the hand action process, as the palm gesture changes, the corresponding tracking points of the hand change so that the cursor may also drift (move or slide). As a result, it is necessary to let, when the hand action finishes, the cursor go back to the start point of the hand action so as to carry out the corresponding hand gesture-based command. However, this kind of problem has not been solved in the prior art up to now.

In what follows, the determination method of start and end frames of a palm gesture-related hand action according to an embodiment of the present invention is described.

According to this embodiment, for example, in a case where it is determined that there is an open palm gesture or a closed palm gesture, the start and end frames are determined as follows.

First, two images related to the maximum difference of each feature are determined and regarded as a candidate start frame and a candidate end frame of the palm gesture-related hand action in a view of the corresponding feature.

After that, on the basis of the weight of each feature and the candidate start and end frames in views of the corresponding feature, a start frame and an end frame are determined.

For example, according to the above-described equation (1) for calculating the maximum difference, as for d1, it is possible to obtain a possible (probable) start frame (s1) and a possible end frame (e1). Similarly, as for d2, it is possible to obtain a possible start frame (s2) and a possible end frame (e1). In the same way, as for dm, it is possible to obtain a possible start frame (sm) and a possible end frame (em). If it is assumed that the degree of importance of the i-th maximum feature difference with respect to the palm gesture recognition is expressed as $w_i$, then by carrying out weighting and voting with respect to the possible start frame s(i) and the possible end frame e(i) related to the respective features, as for the maximum feature difference vector {d1, d2, . . . , dm}, it is possible to obtain a most possible start frame s and a most possible end frame e. In this way, it is possible to provide accurate position information for letting a cursor go back when an open or closed palm gesture is applied to, for example, the "handMouse" system. In an example, each component of the maximum feature difference vector and its related start and end frames are stored interconnected.

The following TABLE 1 shows an example of how to determine a most possible start frame of a palm gesture-related hand action on the basis of the calculation of a maximum feature difference. In this example, the size of a sliding window is 3, i.e., the number of images for recognition of a palm gesture-related hand action is 3. These images are indicated by a first frame, a second frame, and a third frame in the first column of TABLE 1, respectively. The most possible start frame is determined on the basis of not only most possible start and end frames related to each of components d1, d2, . . . , dm in the maximum feature difference vector {d1, d2, . . . , dm} but also a weight related to the corresponding component. In TABLE 1, the cell corresponding to the first frame and the component d1 indicates that the start frame related to the component d1 is 1 (i.e., as for d1, s of f1(s) in the above equation (1) is 1; that is to say, as for the first feature corresponding to the first component, its corresponding maximum feature difference obtained by carrying out subtraction between the first frame and another frame is d1), and the weight related to the component d1 is w1. As a result, on the basis of the component d1, it is possible to obtain an assessment score 1*w1 when the first frame serves as the start frame. In the same way, as for each of the second and third frames, it is possible to obtain its assessment score 0*w1 when it serves as the start frame. Similarly, it is apparent that on the basis of the component d2, the assessment score when the first frame serves as the start frame is 1*w2, and the assessment score when each of the second and third frames serves as the start frame is 0*w2. As for the component d3, its related start frame is the second frame. As a result, on the basis of the component d3, it is possible to obtain the assessment score 1*w3 when the second frame serves as the start frame and the assessment score 0*w3 when each of the second and third frame serves as the start frame. After that, by calculating the sum of the assessment scores corresponding to the all components d1 to d8 in the raw of TABLE 1 at which the first frame is located, the total assessment score when the first frame serves as the start frame is obtained, i.e., 1*w1+1*w2+0*w3+1*w4+0*w5+1*w6+0*w7+1*w8. In a case where the weight corresponding to each of the plural features is 1, the total assessment score is 5. Similarly, in a case where the weight corresponding to each of the plural features is 1, it is possible to obtain the total assessment score 3 when the second frame serves as the start frame and the total assessment score 0 when the third frame serves as the start frame. In this way, it is possible to select a frame whose corresponding assessment score is highest to serve as the start frame; for example, in this example, the first frame whose corresponding assessment score is 5 is selected to serve as the start frame.

In the same way, it is also possible to determine the end frame of a palm gesture-related hand action.

TABLE 1

|  | d1 | d2 | d3 | d4 | d5 | d6 | d7 | d8 | Total |
|---|---|---|---|---|---|---|---|---|---|
| 1st frame | 1*w1 | 1*w2 | 0*w3 | 1*w4 | 0*w5 | 1*w6 | 0*w7 | 0*w8 | 5 |
| 2nd frame | 0*w1 | 0*w2 | 1*w3 | 0*w4 | 1*w5 | 0*w6 | 1*w7 | 0*w8 | 3 |
| 3rd frame | 0*w1 | 0*w2 | 0*w3 | 0*w4 | 0*w5 | 0*w6 | 0*w7 | 0*w8 | 0 |

As a result, by determining the start and end frames of a palm gesture-related hand action according to the above embodiment, it is possible to obtain the time points corresponding the start and end frames. In this way, it is possible to provide accurate position information for letting a cursor go back when a hand gesture (an open or closed palm gesture) is applied to, for example, the "handMouse" system.

In addition, according to the calculation of the maximum feature difference and the confirmation of the start frame of the palm gesture-related hand action, it is obvious that in a case where the length of a sliding window is fixed, no matter how many frames the palm gesture-related hand action takes to finish (for example, the palm gesture-related hand action finishes in K frames or in a part of K frames), it is possible to obtain an equal maximum feature difference. As a result, in view of the feature description and extraction, it is possible to solve the above-described problem that if the number of frames for carrying out recognition of a hand gesture (an open or closed palm gesture) changes, then in general it is impossible to carry out the recognition well. That is to say, the open-or-closed palm gesture recognition method according to the embodiments of the present invention is self-adaptive for the number of frames used to conduct the hand gesture recognition.

2.3. Combination Method of Palm Gestures of Adjacent Palm Gesture Recognition Units In many cases, open-or-closed palm gesture recognition is a continuous process. That is to say, for example, a sliding window selects K images (frames) in the input image sequence to form a recognition unit, and the open-or-closed palm gesture recognition is carried out with respect to the recognition unit. After that, the sliding window moves backward along the input image sequence (in general, moves frame by frame) to another position to reselects K images (frames) from the other position in the image sequence to serve as another recognition unit, and the open-or-closed palm gesture recognition is carried out with respect to the other recognition unit. As a result, there are overlapped images between each recognition unit and its adjacent recognition unit. For this reason, in an embodiment of the present invention, it is preferred that processing be carried out further, after respective recognition units are classified, with respect to the classified recognition units so as to determine an open or closed palm gesture on the basis of the results of the classifications. In this way, it is possible to conduct an open or closed palm gesture determination from images to the related hand action. In this kind of step, the processing is making some rules to combine palm gesture classification results of adjacent recognition units.

According to an embodiment of the present invention, the open-or-closed palm gesture recognition method shown in FIG. 3 may include a step of moving the position of a sliding window along an image sequence; a step of carrying out the palm shape image acquirement step, the feature extraction step, the maximum feature difference vector calculation step, and the open-or-closed palm gesture determination step with respect to plural images in the moved sliding window; and a step of combining, if a palm gesture obtained by carrying out the open-or-closed palm gesture recognition with respect to the plural images in the sliding windows before movement is the same with that obtained by carrying out the open-or-closed palm gesture recognition with respect to the plural images in the sliding windows after the movement, the two palm gesture results as one palm gesture, and correcting a start frame and an end frame accordingly.

Figure 7:
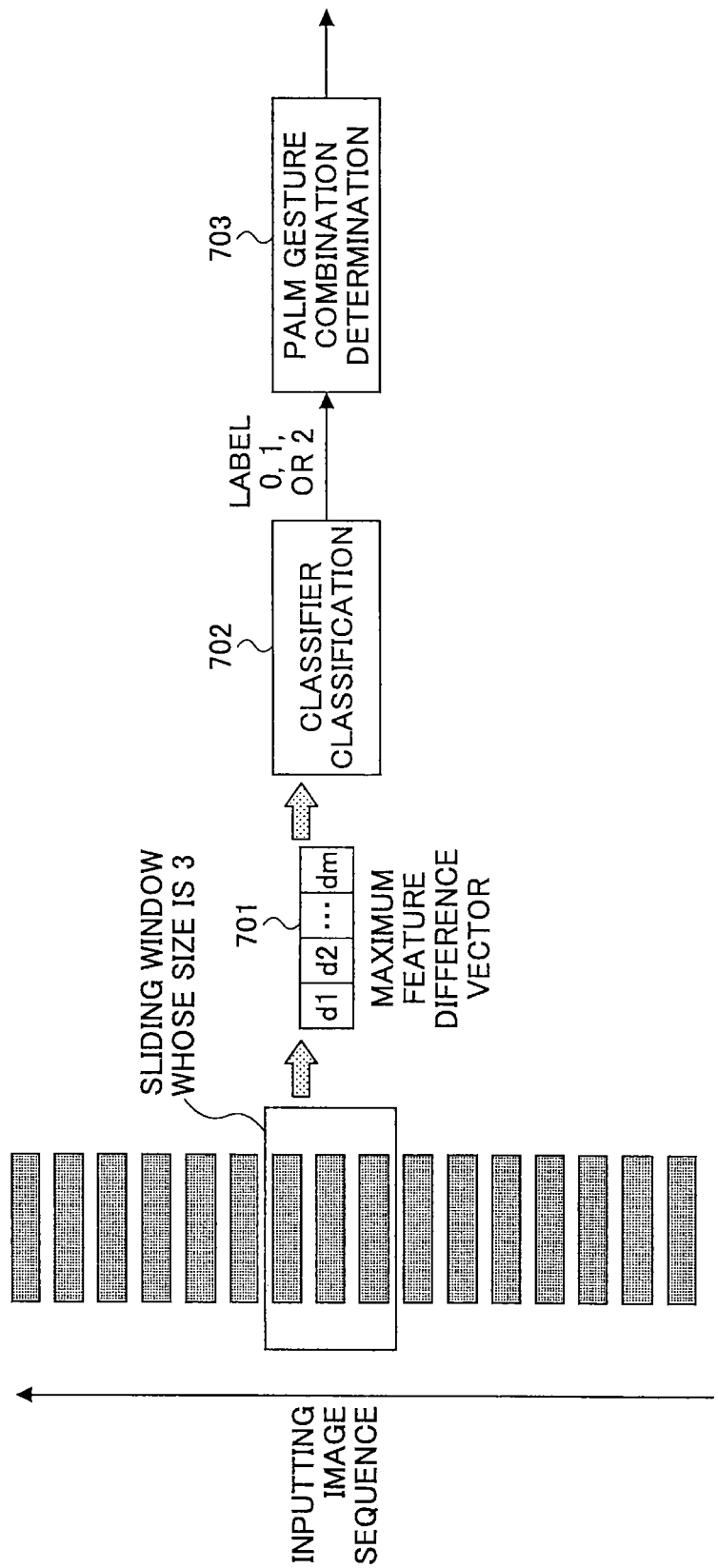
FIG. 7 illustrates a hand action recognition process related to an open or closed palm gesture including the combination of classified palm gesture results of two adjacent recognition units according to an embodiment of the present invention.

In what follows, the combination method of palm gestures of adjacent palm gesture recognition units is illustrated by referring to FIG. 7.

FIG. 7 illustrates an hand action recognition process related to an open or closed palm gesture including the combination of classified palm gesture results of two adjacent recognition units according to an embodiment of the present invention.

As shown in FIG. 7, a camera captures an image sequence in an order of time, and sends the image sequence to a palm gesture recognition system. First, a sliding window whose length is K (in FIG. 7, K=3) takes out K images (frames) in sequence from the image sequence to form a palm gesture recognition unit for carrying out the follow-on processing. Second, on the basis of features extracted from the respective frames satisfying the monotonic characteristic, a maximum feature difference vector (701 in FIG. 7) is calculated from the palm gesture recognition unit formed by K images. Third, the maximum feature difference vector is sent to a palm gesture classifier so as to obtain a classification result as shown by 702 in FIG. 7, wherein, the classification result corresponds to a label 0, 1, or 2. Finally, a determination process of palm gesture combinations is carried out as shown by 703 in FIG. 7 so as to further determine and output a final result on the basis of a classified result sequence.

Figure 8:
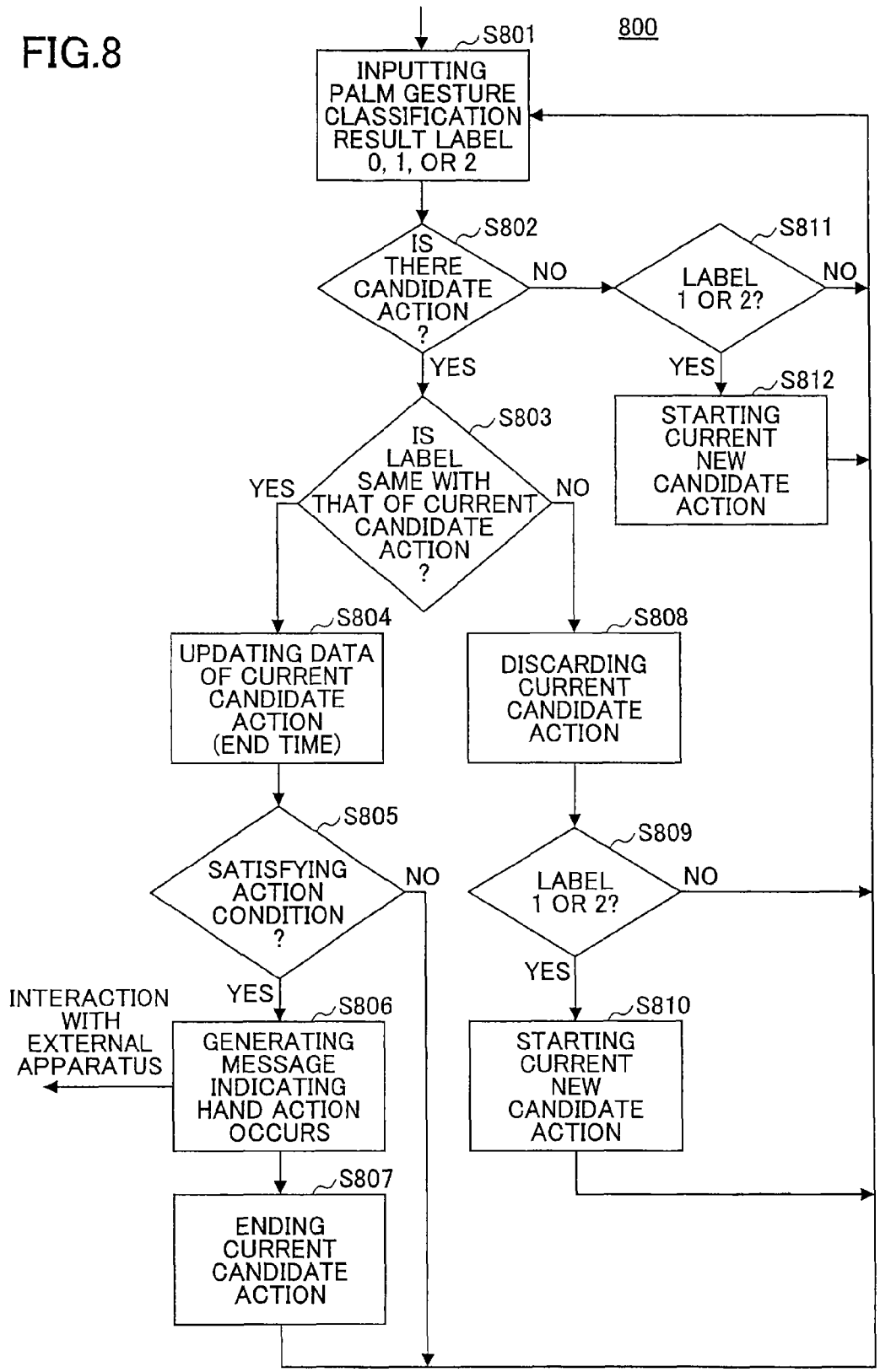
FIG. 8 is a flowchart of a palm gesture combination determination method according to an embodiment of the present invention.

In what follows, a palm gesture combination determination method 800 according to an embodiment of the present invention is illustrated by referring to FIG. 8. This palm gesture combination determination method 800 may be applied to the palm gesture combination determination process 703 in FIG. 7.

FIG. 8 is a flowchart of a hand gesture combination determination method according to an embodiment of the present invention.

As shown in FIG. 8, in STEP S801, a classification result label obtained by carrying out, using a classifier, classification with respect to a recognition unit is input. In STEP S802, it is determined whether or not there is a candidate action. Here, whether or not there is a candidate action may be indicated by a flag or a reset, for example, Fcandidate=0 may mean that there is not a candidate action, and Fcandidate=1 may mean that there is a candidate action. At the beginning, there is not a candidate action, i.e., Fcandidate=0. If there is not a candidate action (N in STEP S802), then, in STEP S811, it is determined that the input classification result label is 1 or 2, i.e., the classification result is an open palm gesture or a closed palm gesture. If the input classification result label is neither 1 nor 2, i.e., the classification result is neither an open palm gesture nor a closed palm gesture (N in STEP S811), then the processing of this method goes back to STEP S801 for inputting another classification result label. If the classification result label is 1 or 2, i.e., the classification result is an open palm gesture or a closed palm gesture (Y in STEP S811), then, in STEP S812, a current new candidate action is started, for example, Fcandidate is set to 1, i.e., Fcandidate=1, the current candidate action label is stored as a current label, and the start time and the end time of the current candidate action are recorded. If it is determined in STEP S802 that there is a candidate action (Y in STEP S802), then, in STEP S803, it is determined whether or not the input classification result label is the same with the current candidate action label (i.e., a classification result of a previous recognition unit). If the input classification result label is not the same with the current candidate action label, then, in STEP S808, the current candidate action is discarded, and Fcandidate is set to 0, i.e., Fcandidate=0. After that, in STEP S809, it is determined whether or not the input classification result label is 1 or 2, i.e., whether or not to be classified as an open palm gesture or a closed palm gesture. If the input classification result label is neither 1 nor 2, i.e., the classification result is neither an open palm gesture or a closed palm gesture (N in STEP S809), then the processing of this method goes back to STEP S801 for inputting a next classification result label. If the input classification result label is 1 or 2, i.e., the classification result is an open palm gesture or a closed palm gesture (Y in STEP S809), then, in STEP S810, a current new candidate action is started, for example, Fcandidate is set to 1, i.e., Fcandidate=1, the current candidate action label is stored as a current label, and the start time and the end time of the current candidate action are recorded. After that, the processing of this method goes back to STEP S801 for waiting for the input of the classification result of a next recognition unit. If the current candidate action label is the same with the result of the previous recognition unit (Y in STEP S803), then, in STEP S804, the data of the current candidate action is updated (the end time is updated). After that, in STEP S805, it is determined whether or not the current candidate action satisfies a hand action condition. If the current candidate action satisfies the hand action condition, then, in STEP S806, a message indicating that a hand action occurs is generated so as to make interaction with an external device. After that, in STEP S807, the current candidate action finishes, for example, Fcandidate is set to 0, i.e., Fcandidate=0, and the processing of the this method goes back to STEP S801. In the above process, no matter whether or not a palm gesture is detected, the classification result of a next recognition unit is continuously processed, i.e., the classification result label of the next recognition unit is continuously input.

In STEP S805 of FIG. 8, it is determined whether or not the current candidate action satisfies an action condition. In this way, it is possible to filter out an unsuitable candidate action. For example, a time period in which a palm gesture-related hand action finishes may be utilized as the action condition so as to filter out an improper follow-on candidate action. For example, a time period of a palm gesture-related hand action should be long enough. If the length of the time period is not long enough, for example, less than 1/5 seconds, then the corresponding candidate action is regarded as improper. That is to say, only when the time period is long enough, the corresponding candidate action is determined as proper, and the corresponding human-machine interaction is carried out. Again, for example, in some actual examples, the position of the tracking point of the start point of a palm gesture-related hand action should be near the position of the tracking point of the end point of the palm gesture-related hand action. As a result, it is possible to filter out an improper candidate action on the basis of whether or not the two tracking points approach each other.

On the basis of the method according to the embodiment, it is possible to combine the palm gesture classification results of adjacent recognition units, and more accurately to determine the start frame and the end frame of a palm gesture-related hand action. In this way, it is possible to better carry out the human-machine interaction.

3. OPEN-OR-CLOSED PALM GESTURE RECOGNITION DEVICE

Figure 9:
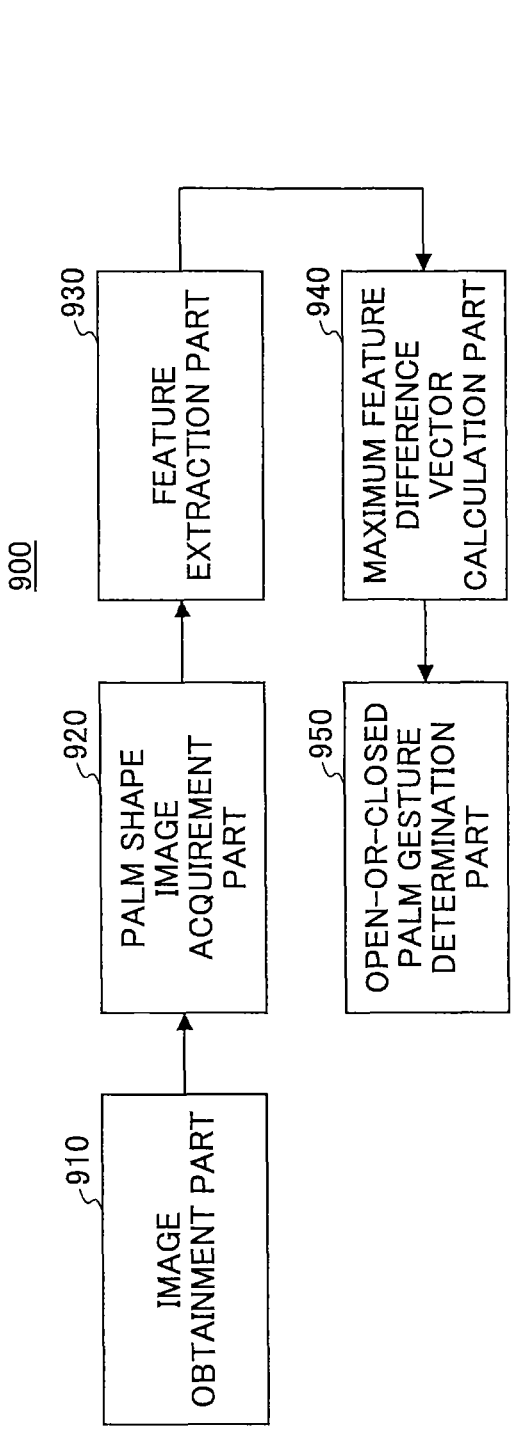
FIG. 9 is a functional block diagram of an open-or-closed palm gesture recognition device according to an embodiment of the present invention.

In what follows, an open-or-closed palm gesture recognition device is illustrated on the basis of FIG. 9.

FIG. 9 is a functional block diagram of an open-or-closed palm gesture recognition device 900 according to an embodiment of the present invention.

As shown in FIG. 9, the open-or-closed palm gesture recognition device 900 is utilized to recognize a hand action from an open palm gesture to a closed palm gesture or from a closed palm gesture to an open palm gesture by carrying out image processing. The open-or-closed palm gesture recognition device includes an image obtainment part 910 configured to obtain plural images; a palm shape image acquirement part 920 configured to obtain plural palm shaped images from the plural images; a feature extraction part 930 configured to extract plural features from each of the plural palm shaped images, wherein, each of the plural features has a monotonic characteristic that values corresponding to this feature obtained during a process from an open palm gesture to a closed palm gesture or from a closed palm gesture to an open palm gesture gradually decrease or increase; a maximum feature difference vector calculation part 940 configured to calculate a maximum feature difference vector formed by a maximum difference of each of the plural features, wherein, the maximum difference of the corresponding feature, which has a sign attribute and a width attribute, is calculated by obtaining a difference related to the corresponding feature between two of the plural palm shaped images according to a predetermined order, and an absolute value of the maximum difference is a maximum absolute value of a difference related to the corresponding feature between any two of the plural palm shaped images; and an open-or-closed palm gesture determination part 950 configured to determine, based on the maximum feature difference vector, that there is an open palm gesture or a closed palm gesture, or there is not an open or closed palm gesture in the plural images. As for the functions and operations of the above-mentioned image obtainment part 910, the palm shape image acquirement part 920, the feature extraction part 930, the maximum feature difference vector calculation part 940, and the open-or-closed palm gesture recognition part 950, since it is possible to refer to the description on the basis of FIGS. 1 to 8, the repeated illustration is omitted here.

4. HUMAN-MACHINE INTERACTION APPARATUS

Figure 10:
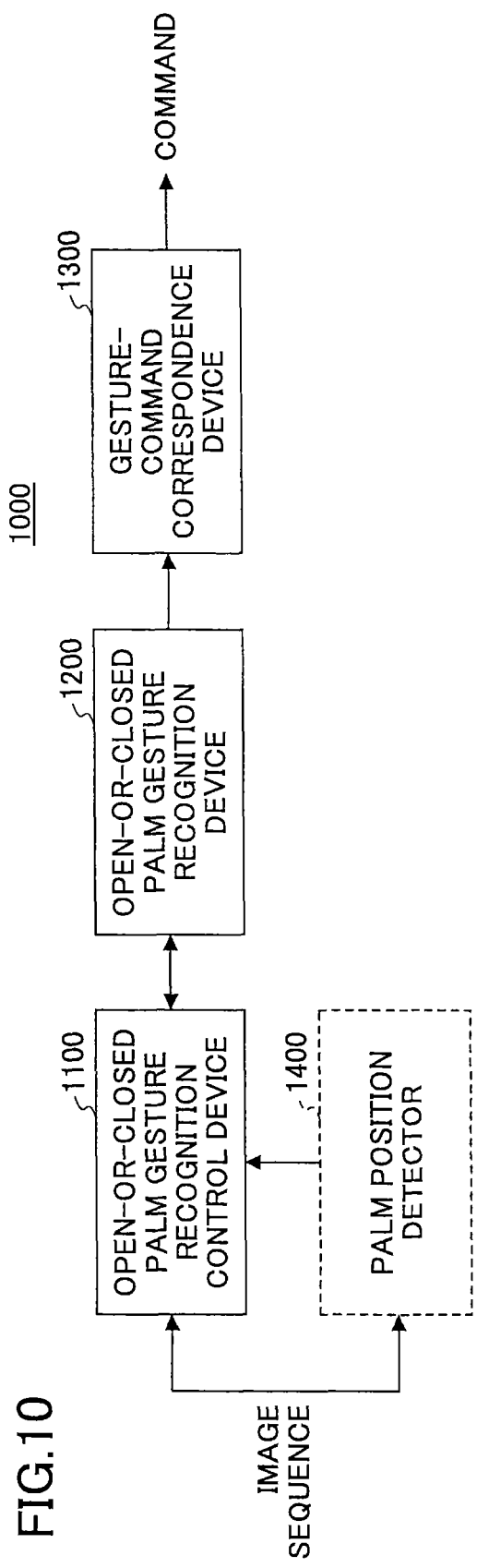
FIG. 10 is a functional block diagram of a human-machine interaction apparatus according to an embodiment of the present invention.

In what follows, a human-machine interaction apparatus 1000 is illustrated on the basis of FIG. 10.

FIG. 10 is a functional block diagram of a human-machine interaction apparatus 1000 according to an embodiment of the present invention.

As shown in FIG. 10, the human-machine interaction apparatus 1000 includes an open-or-closed palm gesture recognition device 1200 which may be achieved by the open-or-closed palm gesture recognition device 900 shown in FIG. 9; an open-or-closed palm gesture recognition control device 1100 configured to control, on the basis of the motion of a hand and the previous hand gesture of the hand, when the open-or-closed palm gesture recognition device 1200 is started to carry out the palm gesture recognition; and a palm gesture-command correspondence device 1300 configured to let an open or closed palm gesture correspond to a control command, wherein, if the open or closed palm gesture is recognized, then the corresponding control command is carried out so as to control, for example, an application program running on a computer, an external device controlled by a computer, etc. In addition, the human-machine interaction apparatus 1000 may further include a palm position detector 1400 configured to detect whether or not the position of a palm is fixed. The palm gesture recognition control device controls, on the basis of the detection result of the palm position detector, when the open-or-closed palm gesture recognition device is started to carry out the palm gesture recognition.

Here it should be noted that the aim of the palm gesture recognition control device 1100 is to not only avoid making an incorrect recognition report generated in palm gesture recognition due to motion blur in a high-speed motion process but also guarantee that the palm gesture recognition may be carried out with respect to any palm gesture of interest. The palm gesture recognition control device 1100 carries out a control on the basis of two operational habits, namely, (i) when a palm gesture-related hand action is carried out, the arm is kept still in general; (ii) an open palm gesture-related hand action always accompanies a closed palm gesture-related hand action, i.e., an open palm gesture and a closed palm gesture always occur in a pair.

The palm gesture recognition control is proposed for the following application. A hand action is utilized to simulate the drag-and-drop operation of a mouse. An open palm gesture corresponds to the movement state of the mouse, and a closed palm gesture corresponds to the left button pressed state of the mouse. In a case of the open palm gesture, it is possible to let the corresponding cursor move to a target. When the cursor is on the target, if the open palm gesture becomes the closed palm gesture, then that corresponds to selecting the target. When the target is selected, the movement of the closed palm gesture corresponds to dragging the target, and at this time, if the closed palm gesture becomes the open palm gesture, then that corresponds to dropping the target. In this way, the drag-and-drop operation of a mouse carried out with respect to a target may be achieved.

At the beginning, only when the position of a hand is basically unchanged (i.e., the corresponding arm is still), an open or closed palm gesture is detected. In this way, some unclear actions may be filtered out. In addition, after a closed palm gesture is detected, since the closed palm gesture becomes an open palm gesture after the closed palm gesture moves, the open palm gesture is detected later. When the open palm gesture is detected, it is necessary to determine whether or not the position of the hand is unchanged at the same time. That is to say, only when the open palm gesture is detected, and it is determined that the position of the hand is unchanged at the same time, it can be said that the open palm gesture is detected.

In an example, the palm position detector 1400 may determine, by analyzing the curve of a motion path of a hand, whether or not the position of the hand is unchanged. For example, if the length and the changed radius of the curve within the last predetermined time period are less than predetermined threshold values, respectively, then it may be determined that the position of the hand is unchanged. Here it should be noted that the motion path curve refers to a path formed by M tracking points related to the hand motion within the last predetermined time period.

Figure 11:
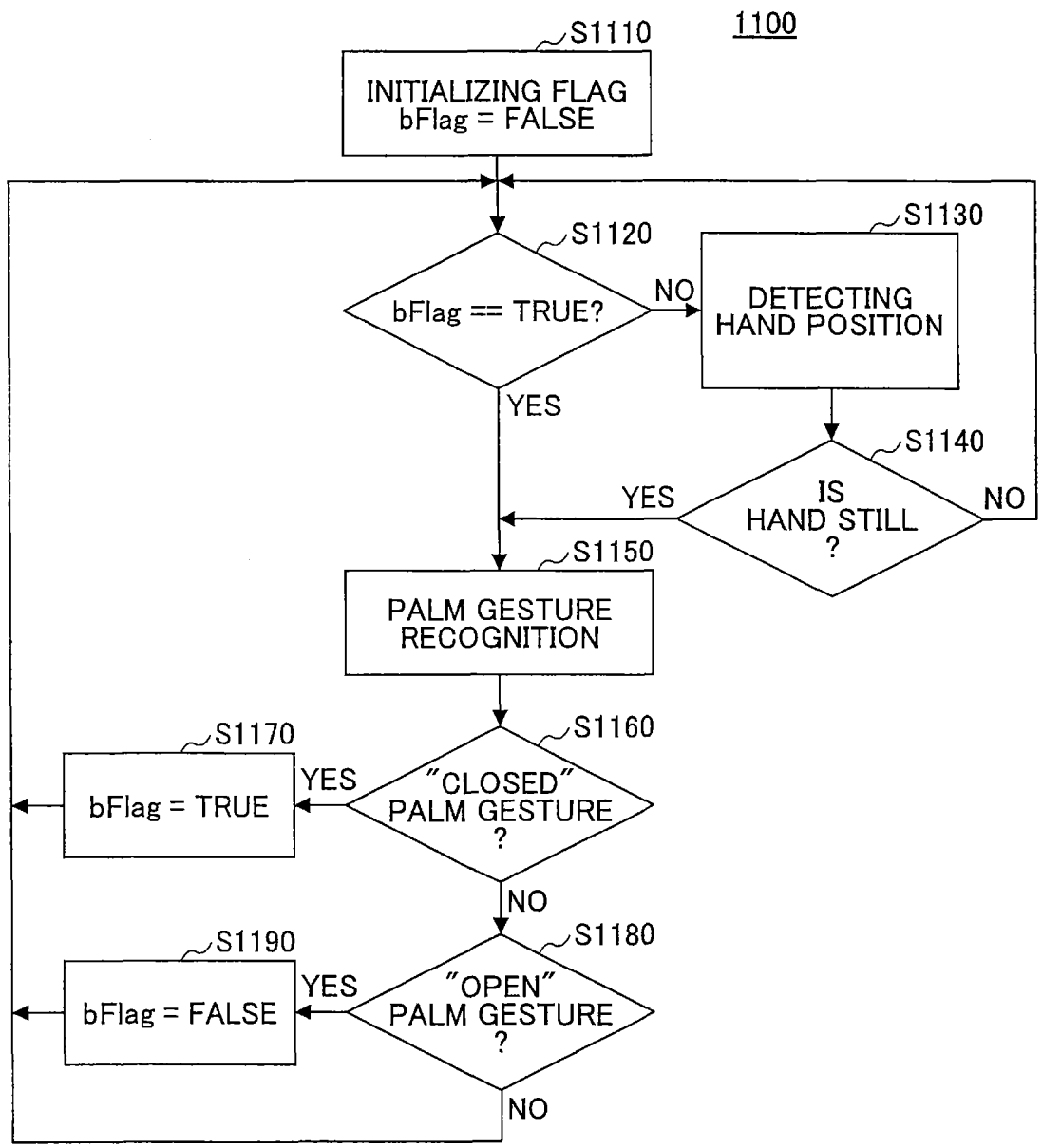
FIG. 11 is a flowchart of an open-or-closed palm gesture recognition control method of controlling, on the basis of a result detected by a palm position detector, when an open-or-closed palm gesture recognition control device starts to carry out an open-or-closed palm gesture recognition process.

In what follows, by referring to FIG. 11, it is illustrated how the palm gesture recognition control device controls, on the basis of the detection result of the palm position detector 1400, when the open-or-closed palm gesture recognition device 1200 starts to carry out an open or closed palm gesture recognition process.

FIG. 11 is a flowchart of an open-or-closed palm gesture recognition control method (process) of controlling, on the basis of a result detected by the palm position detector 1400, when the open-or-closed palm gesture recognition control device 1100 starts to carry out an open-or-closed palm gesture recognition process.

As shown in FIG. 11, the open-or-closed palm gesture recognition control method (process) includes the following steps:

(a) A flag "bFlag" is initialized to "FALSE" (STEP S1110). The flag bFlag indicates whether or not a palm gesture is a closed palm gesture.

(b) It is determined whether the flag bFlag is TRUE or FALSE (STEP S1120). If the flag bFlag is FALSE, then the palm position detector 1400 is utilized (STEP S1130) to determine that a current hand is in a still state or in a motion state (STEP S1140).

(c) If the flag bFlag is TRUE, or it is determined that the current hand is in a still state, then the open-or-closed palm gesture recognition device 900 is utilized to carry out an open or closed palm gesture recognition process (STEP S1150).

(d) If it is determined that the palm gesture is a closed palm gesture (Y in STEP S1160), then the flag bFlag is set to TRUE (STEP S1170); otherwise (N in STEP S1160, the flag bFlag is set to FALSE (STEP S1180).

(e) A next image sequence is input, and the above (b) to (d) are repeatedly carried out with respect to the next image sequence.

According to the flowchart shown in FIG. 11, it is obvious that only when the hand is in a still state (or moves very slowly), an open palm gesture is detected. In other words, once the open palm gesture is detected, the detection with respect to the position of the corresponding hand is conducted too. Only when it is determined that the position of the corresponding hand is in a still state, and the open palm gesture is detected, it can be said that the open palm gesture is detected. In this way, it is possible to not only avoid making an incorrect recognition report generated in palm gesture recognition due to motion blur in a high-speed motion process but also guarantee that the recognition may be carried out with respect to any palm gesture of interest.

5. HUMAN-MACHINE INTERACTION METHOD

Figure 12:
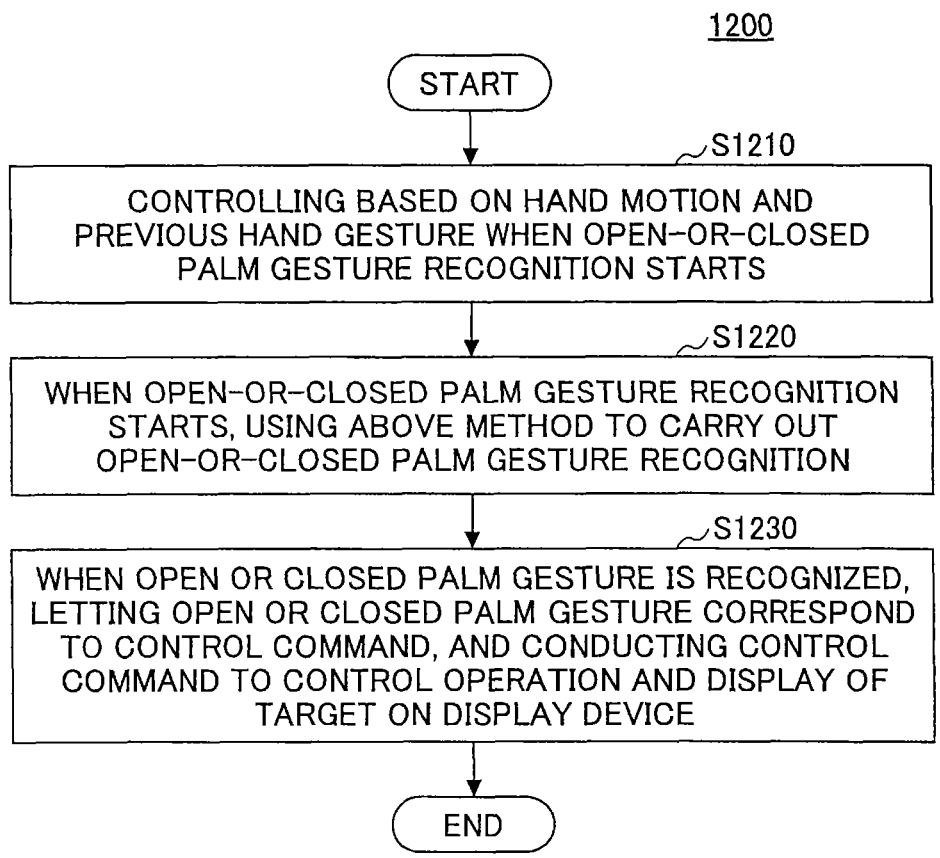
FIG. 12 is a flowchart of a human-machine interaction method according to an embodiment of the present invention.

In what follows, a process of a human-machine interaction method according to an embodiment of the present invention is illustrated by referring to FIG. 12.

FIG. 12 is a flowchart of a human-machine interaction method according to an embodiment of the present invention.

As shown in FIG. 12, in STEP S1210, it is controlled on the basis of the motion of a hand and the previous gesture of the hand when an open-or-closed palm gesture recognition process is started. Here it should be noted that as for the process and operations of STEP S1210, it is possible to refer to the processing and operations described above on the basis of FIG. 11.

In STEP S1220, when the open-or-closed palm gesture recognition process is started, by using the method described above on the basis of FIG. 3, the open or closed palm gesture recognition process is carried out.

In STEP S1230, when an open or closed palm gesture is recognized, the open or closed palm gesture is set to correspond to a control command, and the corresponding control command is carried out. In this way, it is possible to control the operation and display of a target on a display device.

6. SYSTEM HARDWARE ARRANGEMENT

The present invention may also be achieved by an open-or-closed palm gesture recognition (human-machine interaction) hardware system.

Figure 13:
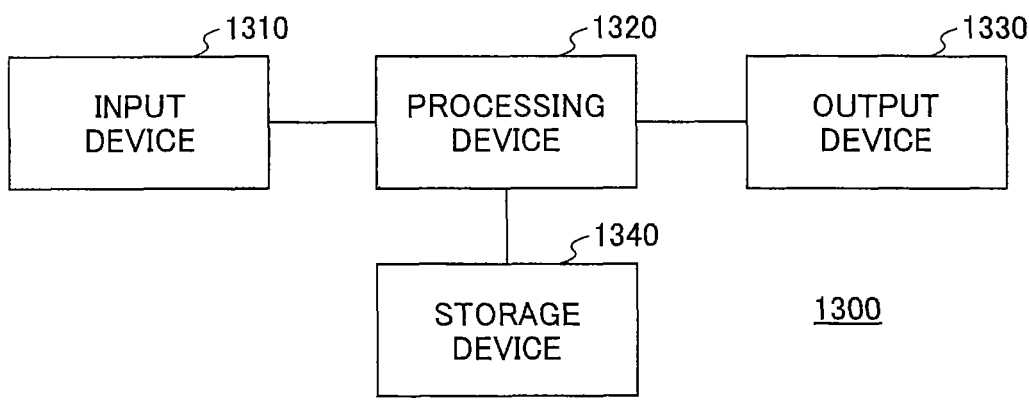
FIG. 13 illustrates a hardware block diagram of an open-or-closed palm gesture recognition (a human-machine) system according to an embodiment of the present invention.

FIG. 13 illustrates a hardware block diagram of an open-or-closed palm gesture recognition (a human-machine) system according to an embodiment of the present invention.

As shown in FIG. 13, an object detection system 1300 may include an input device 1310 configured to input the related images or information from the outside, for example, images or video streams captured by a stereo camera or a color video camera, wherein, the input device 1310 may include, for example, a keyboard, a mouse, a network, or a remote input device connected to the network; a processing device 1320 configured to carry out the open-or-closed palm gesture recognition method described above according to the embodiments of the present invention, or carry out the above-described open-or-closed palm gesture recognition (human-machine interaction), wherein, the processing device 1320 may include, for example, a central processing unit of a computer or a chip having a processing ability, may be connected to a network such the Internet (not shown in the drawings), and may remotely send a result, for example, a human-machine interaction command on the basis of actual needs; an output device 1330 configured to a result obtained in the above-described open-or-closed palm gesture recognition (human-machine interaction) process, wherein, the output device 1330 may include, for example, a display unit, a printer, a network, or a remote output unit connected to the network; and a storage device 1340 configured to store in a volatile or nonvolatile manner the images, features, maximum feature difference vector, hand action start frame, hand action end frame, or various threshold values, wherein, the storage device 1340 may include a volatile or nonvolatile memory such as a RAM, a ROM, a hard disk, or a semiconductor memory.

7. CONCLUSION

According to an embodiment of the present invention, an open-or-closed palm gesture recognition method is provided which is used to recognize a palm gesture from open to closed or from closed to open by utilizing image processing. The open-or-closed palm gesture recognition method comprises an image obtainment step of obtaining plural images according to an order of time; a palm shape image acquirement step of acquiring plural palm shaped images from the plural images; a feature extraction step of extracting plural features describing the palm gesture from each of the plural palm shaped images, wherein, each of the plural features has a monotonic characteristic that values corresponding to this feature obtained during a process from an open palm gesture to a closed palm gesture or from a closed palm gesture to an open palm gesture gradually decrease or increase; a maximum feature difference vector calculation step of calculating a maximum feature difference vector formed by a maximum difference of each of the plural features, wherein, the maximum difference of the corresponding feature, which has a sign attribute and an width attribute, is calculated by obtaining a difference related to the corresponding features between two of the plural palm shaped images according to a predetermined order, and an absolute value of the maximum difference is a maximum absolute value of a difference related to the corresponding features between any two of the plural palm shaped images; and an open-or-closed palm gesture determination step of determining, on the basis of the maximum feature difference vector, that there is an open palm gesture or a closed palm gesture, or there is not an open or closed palm gesture in the plural images.

According to another embodiment of the present invention, an open-or-closed palm gesture recognition device is provided which is used to recognize a palm gesture from open to closed or from closed to open by utilizing image processing. The open-or-closed palm gesture recognition device comprises an image obtainment part configured to obtain plural images according to an order of time; a palm shape image acquirement part configured to acquire plural palm shaped images from the plural images; a feature extraction part configured to extract plural features describing the palm gesture from each of the plural palm shaped images, wherein, each of the plural features has a monotonic characteristic that values corresponding to this feature obtained during a process from an open palm gesture to a closed palm gesture or from a closed palm gesture to an open palm gesture gradually decrease or increase; a maximum feature difference vector calculation part configured to calculate a maximum feature difference vector formed by a maximum difference of each of the plural features, wherein, the maximum difference of the corresponding feature, which has a sign attribute and a width attribute, is calculated by obtaining a difference related to the corresponding features between two of the plural palm shaped images according to a predetermined order, and an absolute value of the maximum difference is a maximum absolute value of a differences related to the corresponding features between any two of the plural palm shaped images; and an open-or-closed palm gesture determination part configured to determine, based on the maximum feature difference vector, that there is an open palm gesture or a closed palm gesture, or there is not an open or closed palm gesture in the plural images.

In the open-or-closed palm gesture recognition method and the open-or-closed palm gesture recognition device according to the embodiments of the present invention, the monotonic characteristic that values related to the corresponding feature obtained during a process from an open palm gesture to a closed palm gesture or from a closed palm gesture to an open palm gesture gradually decrease or increase is adopted to determine the maximum feature difference vector on the basis of the respective features, and the palm gesture determination is carried out on the basis of the maximum feature difference vector. As a result, at least the following advantage may be obtained, namely, it is possible to, since the monotonic characteristic of the hand action related to the pale gesture is described intuitively, not only accelerate the classifier learning and palm gesture recognition due to low dimension but also be self-adaptive when the number of hand action frames changes in a case where the length of a sliding window is fixed.

Furthermore, in the open-or-closed palm gesture recognition method and the open-or-closed palm gesture recognition device according to the embodiments of the present invention, it is possible to determine, in a case where it is determined that there is an open or closed palm gesture, a start palm gesture frame and an end palm gesture frame. In particular, two images (frames) are determined which are related to the maximum difference of each of the plural features, and then the two images are regarded as a candidate start palm gesture frame and a candidate end palm gesture frame related to the corresponding feature. After that, on the basis of the weight of each of the plural features as well as the candidate start palm gesture frame and the candidate end palm gesture frame related to the corresponding feature, the start palm gesture frame and the end palm gesture frame are determined. By utilizing the determined start palm gesture frame and end palm gesture frame, it is possible to obtain the time point of the start palm gesture frame and the time point of the end palm gesture frame. As a result, for example, if these kinds of information are applied to a system like a "handMouse", then it is possible to accurately determine the position of a cursor so as to provide accurate position information.

Moreover, in the open-or-closed palm gesture recognition method and the pen-or-closed palm gesture recognition device according to the embodiments of the present invention, the position of the sliding window is moved according to an image sequence; the palm shape image acquirement step, the feature extraction step, the maximum feature difference vector calculation step, and the open-or-closed palm gesture determination step are carried out with respect to plural images in the moved sliding window; and if a same open or closed palm gesture is obtained by the palm gesture recognition carried out with respect to the plural images in the sliding window before and after movement, then the palm gesture recognition results are combined as one open or closed palm gesture, and the corresponding start frame and end frame are modified accordingly. In this way, it is possible to combine the palm gesture recognition results of two adjacent recognition units, and to more accurately provide a start palm gesture frame and an end palm gesture frame, so as to better perform human-machine interaction.

According to still another embodiment of the present invention, a human-machine interaction method is provided. The human-machine interaction method comprises a step of controlling, on the basis of a hand motion and a previous hand gesture, when an open-or-closed palm gesture recognition process starts; a step of carrying out, when the open-or-closed palm gesture recognition process stars, the open-or-closed palm gesture recognition process by utilizing the open-or-closed palm gesture recognition method; and a step of causing, when an open or closed palm gesture is recognized, the open or closed palm gesture to correspond to a control command, and carrying out the control command so as to control an operation and display of an object on a display device.

By employing the human-machine interaction method and the human-machine interaction apparatus according to the embodiments of the present invention, it is possible to not only avoid making an incorrect recognition report generated in palm gesture recognition due to motion blur in a high-speed motion process but also guarantee that the recognition may be carried out with respect to any palm gesture of interest.

The open-or-closed palm gesture recognition method and device, the human-machine interaction method and apparatus are suitable to be applied not only to a depth map but also to a conventional color image.

Here it should be noted that the above descriptions are just for illustration. In other words, it is possible to make various modifications on the basis of the above descriptions.

For example, in the open-or-closed palm gesture recognition method, a case is described in which for one palm recognition unit, the corresponding maximum feature difference vector is calculated on the basis of various features, and then a palm gesture is determined only on the basis of the maximum feature difference vector. However, this is just an example. That is to say, the meaning of "on the basis of a maximum feature difference vector" is open, but is not exclusive. It is also possible to determine a palm gesture on the basis of a maximum feature difference vector and other factors. For example, it is also possible to calculate a change process of each feature in a palm gesture recognition unit, to analyze whether or not the change trends of the respective features are coincident, and then to carry out a palm gesture determination process on the basis of the analyzed result and a maximum feature difference vector.

Again, for example, in the above descriptions, the features for describing a palm gesture are the width f1, the height f2, and the area f3 of a maximum rectangle covering a palm along a main direction of the palm, the perimeter f4, the area f5, and the defective value f6 of a minimum convex polygon on the basis of the palm outline, the length f7 of the palm outline, and the area f8 of the palm surrounded by the palm outline. However, it should be noted that these features are just examples, i.e., these features are not used to limit the present invention. In other words, the number of features for describing a palm in not limited to eight, and may be selected on the basis of actual needs.

In addition, it should be noted that the above respective embodiments are just exemplary ones, and the specific structure and operation of each of them is not used for limiting the present invention.

Moreover, the embodiments of the present invention may be implemented in any convenient form, for example, using dedicated hardware, or a mixture of dedicated hardware and software. The embodiments of the present invention may be implemented as computer software implemented by one or more networked processing apparatuses. The network may comprise any conventional terrestrial or wireless communications network, such as the Internet. The processing apparatuses may comprise any suitably programmed apparatuses such as a general purpose computer, a personal digital assistant, a mobile telephone (such as a WAP or 3G-compliant phone) and so on. Since the embodiments of the present invention can be implemented as software, each and every aspect of the present invention thus encompasses computer software implementable on a programmable device.

The computer software may be provided to the programmable device using any storage medium for storing processor-readable code such as a floppy disk, a hard disk, a CD-ROM, a magnetic tape device or a solid state memory device.

The hardware platform includes any desired hardware resources including, for example, a central processing unit (CPU), a random access memory (RAM), and a hard disk drive (HDD). The CPU may include processors of any desired type and number. The RAM may include any desired volatile or nonvolatile memory. The HDD may include any desired nonvolatile memory capable of storing a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

While the present invention is described with reference to the specific embodiments chosen for purpose of illustration, it should be apparent that the present invention is not limited to these embodiments, but numerous modifications could be made thereto by those people skilled in the art without departing from the basic concept and technical scope of the present invention.

The present application is based on and claims the benefit of priority of Chinese Priority Patent Application No. 201310016169.1 filed on Jan. 16, 2013, the entire contents of which are hereby incorporated by reference.

What is claimed is:

1. An open-or-closed palm gesture recognition method used to recognize an open or closed palm gesture by utilizing image processing, the method comprising:
   an image obtainment step of obtaining plural images according to an order of time;
   a palm shape image acquirement step of acquiring plural palm shaped images from the plural images;
   a feature extraction step of extracting plural features describing the open or closed palm gesture from each of the plural palm shaped images, wherein, each of the plural features has a monotonic characteristic that values corresponding to this feature obtained during a process between the open palm gesture and the closed palm gesture gradually decrease or increase;
   a maximum feature difference vector calculation step of calculating a maximum feature difference vector formed by a maximum difference of each of the plural features, wherein, the maximum difference of the corresponding feature, which has a sign attribute and an width attribute, is calculated by obtaining a difference related to the corresponding features between two of the plural palm shaped images according to a predetermined order, and an absolute value of the maximum difference is a maximum absolute value of a difference related to the corresponding features between any two of the plural palm shaped images; and an open-or-closed palm gesture determination step of determining, based on the maximum feature difference vector, that there is the open or closed palm gesture or there isn't the open or closed palm gesture in the plural images.

2. The method according to claim 1, wherein:

in a case where there is the open or closed palm gesture, a start frame and an end frame of a hand action related to the open or closed palm gesture are determined, wherein, two images related to a maximum difference of each of the plural features are determined, and the two images are regarded as a candidate start frame and a candidate end frame of the hand action related to the open or closed palm gesture in a view of the corresponding features; and the start frame and the end frame of the hand action related to the open or closed palm gesture are determined based on a weight of each of the plural features as well as the candidate start frame and the candidate end frame of the hand action related to the open or closed palm gesture.

3. The method according to claim 1, wherein:

a number of the plural images is determined based on a frequency histogram of a number of hand action frames and a predetermined level of confidence.

4. The method according to claim 1, wherein, the plural image are selected in sequence from an input image sequence by using a sliding window, and the method further comprises:

a step of moving a position of the sliding window in sequence along the image sequence;

a step of carrying out the palm shape image acquirement step, the feature extraction step, the maximum feature difference vector calculation step, and the open-or-closed palm gesture recognition step with respect to plural images in the sliding window after movement; and a step of combining, if an open or closed palm gesture obtained from a result of open-or-closed palm gesture recognition carried out with regard to plural images in the sliding window before movement is the same with that obtained from a result of open-or-closed palm gesture recognition carried out with respect to plural images in the sliding window after movement, the two results of open-or-closed palm gesture recognition as one open or closed palm gesture, and correcting a start frame and an end frame of a hand action related to the open or closed palm gesture accordingly.

5. The method according to claim 1, wherein:

The plural features extracted in the feature extraction step are selected from a length, a width, and an area of a minimum rectangle covering a palm along a main direction of the palm; a length, an area, and a defective value of a convex polygon based on an outline of the palm; and a length of the outline of the palm and an area of the palm surrounded by the outline.

6. An open-or-closed palm gesture recognition device configured to recognize an open or closed palm gesture by utilizing image processing, the device comprising:

an image obtainment part configured to obtain plural images according to an order of time;

a palm shape image acquirement part configured to acquire plural palm shaped images from the plural images;

a feature extraction part configured to extract plural features describing the open or closed palm gesture from each of the plural palm shaped images, wherein, each of the plural features has a monotonic characteristic that values corresponding to this feature obtained during a process between the open palm gesture and the closed palm gesture gradually decrease or increase;

a maximum feature difference vector calculation part configured to calculate a maximum feature difference vector formed by a maximum difference of each of the plural features, wherein, the maximum difference of the corresponding feature, which has a sign attribute and a width attribute, is calculated by obtaining a difference related to the corresponding features between two of the plural palm shaped images according to a predetermined order, and an absolute value of the maximum difference is a maximum absolute value of a difference related to the corresponding features between any two of the plural palm shaped images; and an open-or-closed palm gesture determination part configured to determine, based on the maximum feature difference vector, that there is the open or closed palm gesture or there isn't the open or closed palm gesture in the plural images.

7. A human-machine interaction apparatus comprising:

the open-or-closed palm gesture recognition device according to claim 6;

an open-or-closed palm gesture recognition control device configured to control, based on a motion of a hand and a previous gesture of the hand, when the open-or-closed palm gesture recognition device starts to carry out an open-or-closed palm gesture recognition process; and a gesture-command correspondence device configured to let, when an open or closed palm gesture is recognized, the open or closed palm gesture correspond to a control command, and to carry out the corresponding control command.

8. The apparatus according to claim 7, further comprising:

a palm position detector configured to detect whether or not a position of a palm is unchanged, wherein, the open-or-closed palm gesture recognition control device controls, based on a result detected by the palm position detector, when the open-or-closed palm gesture recognition device starts to carry out the open-or-closed palm gesture recognition process.

9. The apparatus according to claim 8, wherein, the open-or-closed palm gesture recognition device controls, based on the result detected by the palm position detector, when the open-or-closed palm gesture recognition device stars to carry out the open-or-closed palm gesture recognition process, by carrying out steps as follows:

(a) initializing a flag bFlag to FALSE;

(b) determining that the flag bFlag is TRUE or FALSE, and then, detecting by the palm position detector, if the flag bFlag is FALSE, whether or not the position of the palm is unchanged;

(c) carrying out an open-or-closed palm gesture recognition process by utilizing the open-or-closed palm gesture recognition device if the flag fFlag is TRUE or it is detected that the position of the palm is unchanged;

(d) setting the flag bFlag to TRUE if a closed palm gesture is recognized, or setting the flag bFlag to FALSE if an open palm gesture is recognized; and (e) carrying out STEPS (b) to (d) in sequence with respect to a next input image sequence.

10. A human-machine interaction method comprising:
a step of controlling, based on a motion of a hand and a previous gesture of the hand, when an open-or-closed palm gesture recognition process starts;
a step of carrying out, when the open-or-closed palm gesture recognition process is controlled to start, the open-or-closed palm gesture recognition process by utilizing the open-or-closed palm gesture recognition method according to claim 1; and
a step of letting, when an open or closed palm gesture is recognized, the open or closed palm gesture corresponding to a control command, and then carrying out the corresponding control command so as to control an operation and display of a target on a display device.

* * * * *